United States Patent

Furuya et al.

[11] Patent Number: 6,143,385
[45] Date of Patent: *Nov. 7, 2000

[54] METHOD FOR HOLLOW INJECTION MOLDING A SHAFT-UNIFIED TYPE ROTATOR AND A MOLDED ARTICLE OBTAINED THEREBY

[75] Inventors: Norihiko Furuya; Kimihiro Kubo, both of Yokohama; Masaaki Kondo, Kawasaki, all of Japan

[73] Assignee: Asahi Kasei Kogyo Kabushiki Kaisha, Osaka, Japan

[*] Notice: This patent is subject to a terminal disclaimer.

[21] Appl. No.: 08/809,223

[22] PCT Filed: Oct. 17, 1995

[86] PCT No.: PCT/JP95/02122

§ 371 Date: Mar. 18, 1997

§ 102(e) Date: Mar. 18, 1997

[87] PCT Pub. No.: WO96/12613

PCT Pub. Date: May 2, 1996

[30] Foreign Application Priority Data

Oct. 24, 1994 [JP] Japan .................................. 6-258369

[51] Int. Cl.⁷ .................................................. B29D 22/00
[52] U.S. Cl. ....................... 428/36.9; 264/328.8; 264/572
[58] Field of Search ..................... 264/572, 573, 264/574, 328.1–328.13; 464/19, 47, 88, 109, 181, 182, 183, 903; 428/586, 34.1, 34.2, 34.3, 34.4, 34.5, 34.6, 34.7, 36.8, 36.9, 36.92, 906

[56] References Cited

U.S. PATENT DOCUMENTS

| 4,101,617 | 7/1978 | Friederich | 264/93 |
| 4,601,870 | 7/1986 | Sasaki | 264/572 |
| 5,186,884 | 2/1993 | Hendry | 264/572 |
| 5,254,306 | 10/1993 | Inada et al. | 264/572 |
| 5,308,574 | 5/1994 | Yamazaki et al. | 264/572 |
| 5,612,067 | 3/1997 | Kurihara et al. | 425/533 |
| 5,773,109 | 6/1999 | Kubo et al. | 428/36.9 |

FOREIGN PATENT DOCUMENTS

| 3835964 | 1/1993 | Germany . |
| 5208460 | 8/1993 | Japan . |
| 7108558 | 4/1995 | Japan . |

Primary Examiner—Nasser Ahmad
Assistant Examiner—Derek Jessen
Attorney, Agent, or Firm—Birch, Stewart, Kolasch & Birch, LLP

[57] ABSTRACT

The present invention relates to a method for hollow injection molding. More particularly, it concerns a method for hollow injection molding a shaft-unified type resin rotator with excellent productivity. The molded article obtained by the present invention is excellent in dimensional accuracy, strength, surface appearance and recyclability of materials.

28 Claims, 24 Drawing Sheets

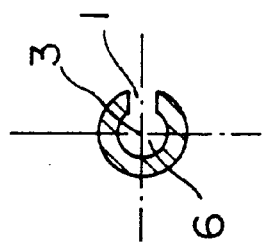
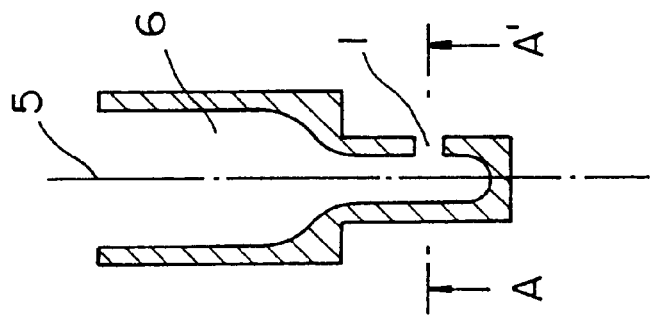
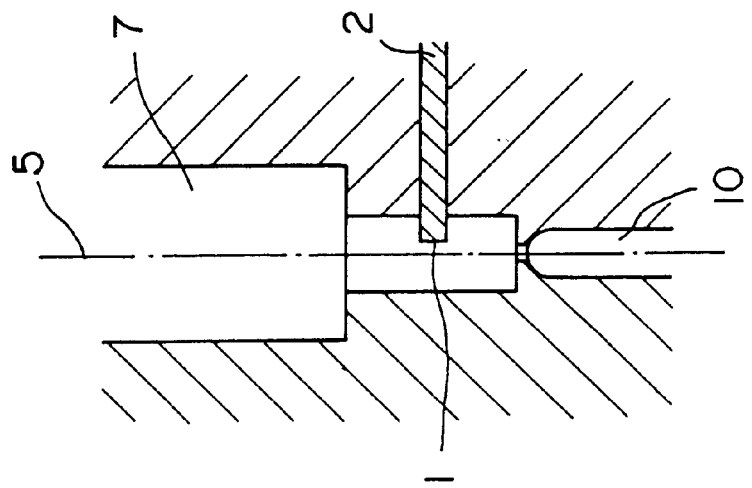

METHOD FOR HOLLOW INJECTION MOLDING A SHAFT-UNIFIED TYPE ROTATOR AND A MOLDED ARTICLE OBTAINED THEREBY

TECHNICAL FIELD

The present invention relates to a method for preparing a shaft-unified type rotator. More particularly, it concerns a method for hollow injection molding a shaft-unified type rotator, and a molded article obtained thereby which is excellent in dimensional accuracy, appearance, productivity and environmental protectability such as recyclability.

BACKGROUND ART

In the past, methods for hollow injection molding have been developed and established mainly to achieve light weight, good rigidity, reduction in a number of parts and unification of composing parts among relatively large molded articles such as interior and exterior finish parts of cars and exterior finish parts of televisions. However, the hollow injection molding has been recently noticed as a molding method which meets increasing demands for improvement in dimensional accuracy and unification of composing parts among relatively small molded articles such as a gear and a roller.

Resin rotators are widely used as a mechanical part in various fields such as ordinary machinery, precision machinery and electric and electronic equipment. Since resin rotators are good at moldability, have light weight and do not get rusty, demand for rotators made of various resins has been increasing and high accuracy has been also required of such rotators in these years. Usually, such rotators are preferably molded so as to unify their whole body including a shaft for transmitting 100% of power.

Heretofore, attempts have been made to mold a shaft-unified type rotator by ordinary injection molding methods. However, when a rotator is molded in a unified body according to these methods, partially thick-walled parts are often produced in the resultant molded article with enhanced deformation such as sink marks, warpage and deflection of the resin. Consequently, the rotator tends to deteriorate in its dimensional accuracy such as cylindricity and coaxiality.

For improving the conventional injection molding methods, Japanese Patent Application Laid-Open No. 208460/1993 and DE Patent Publication No. 3835964 disclose an improved injection molding method for preparing a hollow molded article. This method comprises injecting a molten resin so as to leave a non-filled part and charging a pressurized gas into the resin so as to spread the resin into the non-filled part with a mold capable of forming a resin roller in a body.

Since the mold used in this method has a charging port for a pressurized gas in a cavity, traces of the charged gas remain at the part where the supply pipe is furnished. Therefore, a process for cutting off the traced part is required after the molded article is taken out from the mold. Further, since a cavity is arranged in the mold so that the axis of the cavity may be horizontal, the wall thickness is hard to be uniform in a cross-section vertical to the axis of the molded article. Accordingly, the molded articles have had many problems such that they do not have certain functions of rotators, since the centers of gravity and the shaft of the molded articles do no agree and their dimensional accuracy is poor.

Further, Japanese Patent Application Laid-Open No. 108558/1995 discloses a method for preparing a rotator by hollow injection molding with a mold having a structure wherein a cavity is arranged so that the axis of the rotator may be vertical, and a gate and an entrance for a pressurized gas are equipped at the bottom of the cavity.

The mold employed in this method has an entrance for a pressurized gas at the intersection of the axis of the rotator and the bottom of the cavity. However, the gate for a resin is arranged apart from the entrance for the gas so that it is difficult to inject a resin into the cavity under a uniform pressure. Accordingly, the wall thickness of the resultant rotator becomes ununiform around the gate. Since the gate for a resin and the entrance for the pressurized gas is arranged at the intersection of the axis of the rotator and the bottom of the cavity, it is difficult to take out the resultant rotator from the mold, and sometimes the gas may leak from the entrance for the gas at molding, or the rotator may deform when it is taken out from the mold.

DISCLOSURE OF THE INVENTION

The present invention is to provide a method for preparing a shaft-unified type resin rotator having a hollow part in the inside, which method comprises arranging a mold having a gate equipped at the intersection of the axis of the rotator and an edge surface of a cavity so that the edge surface having the gate may be the bottom of the cavity and the axis may be vertical, and carrying out hollow injection molding.

The term "method for hollow injection molding" in the present invention means an injection molding method for producing a hollow molded article which comprises charging a pressurized fluid into a molten resin while or after the molten resin is injected into the cavity of a mold. The volume of the molten resin injected into the mold reduces as the resin becomes cooler and harder. In an ordinary injection molding method, a secondary injection pressure (supplementary pressure) is generally applied to supplement a reduced volume of the resin. However, the effect of the secondary injection pressure cannot be obtained after the sealing of the gate because the resin at the gate is solidified.

On the other hand, in the hollow injection molding method, it is possible to press a resin against the cavity surface while supplementing the volume reduction by charging a pressurized fluid into a molten resin. Therefore, a molded article having high dimensional accuracy can be obtained. A representative example of the method for hollow injection molding is disclosed in Japanese Patent Publication No. 14968/1982.

The term "pressurized fluid" in the present invention means a fluid which is used for forming a hollow in a molded article. The present invention employs a fluid which is gaseous or liquid at 23° C. under atmospheric pressure, and which is not reactive to or compatible with a molten resin to be used for molding at the injection molding temperature and pressure. Examples of such fluids include nitrogen, carbon dioxide, air, helium, neon, argon, glycerin and liquid paraffin. A pressurized gas is generally employed. An inert gas such as nitrogen, helium, neon and argon is especially preferred. From the viewpoint of economy, a nitrogen gas is preferred for industrial applications. These fluids usually contain impurities.

The term "cavity" in the present invention means one of the concavities on a mold parting face, where a resin is injected and a rotator is obtained when the molding process completes.

The term "vertical direction" in the present invention generally means a gravity direction. In fact, however, it is practically difficult to set a mold in a molding machine so that the axis of a molded article may be in the exactly vertical direction. In the present invention, it is not necessary to arrange a cavity so that the axis of a molded article may be strictly vertical as long as a molten resin can be uniformly supplied into the cavity from the gate to the top of the cavity. The cavity is arranged preferably within 20 degree-angle from the vertical direction, more preferably within 10 degree-angle from the vertical direction.

When a cavity is arranged so that the axis of the rotator may be vertical, jetting hardly appears in the resultant molded article. The term "jetting" means that meandering marks remain in a molded article due to a meandering of a resin at the beginning of injection.

The hollow injection molding of the present invention is carried out by combining a conventional injection molding machine and an apparatus for charging a pressurized fluid. The apparatus for charging a pressurized fluid is for introducing a pressurized fluid under pressure through a supply pipe into a molten resin in the mold after the injection of the molten resin, and keeping the pressure of the fluid for a predetermined period. There is no limitation on methods for introducing a fluid under pressure as long as the fluid is introduced into the molten resin in a cavity. Examples of such methods include a method comprising keeping a fluid preliminarily compressed to a high pressure in an accumulator and introducing the highly pressurized fluid into a molten resin through a supply pipe, and a method comprising continuously introducing a predetermined amount of a fluid into a molten resin while pressurizing by a pump. The fluid can be charged from any point of the mold as long as a highly pressurized fluid can be injected into a molten resin. For example, the fluid may be charged from a nozzle of a molding machine (hereinafter simply referred to as a nozzle), a sprue or a runner of a mold (hereinafter simply referred to as a sprue or a runner, respectively). When a pressurized fluid is introduced from a nozzle, a sprue or a runner, the-fluid passes through the center of the gate and reaches a cavity to form a hollow in the center of a molded article. As a result, there is obtained a rotator which has good roundness and cylindricity whose gravity substantially coincides with the axis of the rotator.

A hollow molded article can be obtained by charging a pressurized gas from a charging port arranged in a cavity. In this case, however, a resin wall is not formed at the charging port. Accordingly, the shape around the port becomes unsymmetrical as shown in FIG. 1 so that the resin does not uniformly contract after the injection. Then, there may unpreferably cause deterioration of dimensional accuracy such as roundness and increase in run-out.

In order to form a hollow in a molded article effectively, the pressurized fluid is charged into a molten resin in the mold preferably under 20 to 300 kg/cm$^2$, more preferably 50 to 250 kg/cm$^2$.

After charging the pressurized fluid, the pressure in a hollow part must be kept for a predetermined period until the resin is sufficiently cooled and solidified. In order to form a hollow in a molded article effectively, the pressure of the charged fluid is kept favorably for 5 to 120 seconds, more favorably 10 to 60 seconds.

The size of a molding article is easily adjusted by controlling a fluid pressure and a period for keeping a fluid pressure.

A hollow part is formed by selective going of a pressurized fluid injected into a molten resin through unsolidified parts of the resin. Accordingly, the charge of the pressurized fluid must start within 10 seconds, preferably 5 seconds, after the finish of injection. The molten resin starts to cool and solidify from the side contacting to the surface of the cavity if the fluid is charged for more than 10 seconds after the injection of the resin. This makes it difficult to form a hollow in a molded article. Consequently, the effect of a pressurized fluid, such as transferability of a mold, is not fully obtained.

Thermoplastic resins are generally used as a resin employed for the hollow injection molding method of the present invention. Examples of thermoplastic resins to be used in the present invention include a polyethylene, a polypropylene, a polystyrene, an ABS resin, a polyvinyl chloride, a polyamide, polyacetal, a polycarbonate, a modified polyphenylene ether, a polyethylene terephthalate, a polybutylene terephthalate, a polyphenylene sulfide, a polyimide, a polyamide imide, polyether imide, a polyarylate, a polysulfone, a polyether sulfone, a polyetheretherketone, a liquid crystalline resin, a polytetrafluoroethylene and a thermoplastic elastomer. Any thermoplastic resin can be employed as long as ordinary injection molding is carried out. Especially, a polyacetal and a polyamide are excellent not only in heat resistance and mechanical properties but also in tribological properties; they are often used as a material for a rotator and mechanical parts other than a rotator. Therefore, they are preferably used in the present invention.

Further, thermosetting resins can be also employed. The thermosetting resins usable in the present invention include a phenol resin, a urea resin, a melamine resin and an epoxy resin.

Since the molded article of the present invention has a hollow in its inside, an organic or inorganic filler can be blended, if necessary, with a resin to be used for the purpose of improving heat resistance, mechanical strength and other properties. Preferred examples of fillers include reinforcing fillers such as glass fibers, carbon fibers, metallic fibers, aramid fibers, potassium titanate, asbestos, silicon carbide, ceramics, silicon nitride, barium sulfate, calcium sulfate, kaolin, a clay, pyrophyllite, a bentonite, a sericite, a zeolite, a mica, nephelite, talc, attapulgite, wollastonite, slag fibers, a ferrite, calcium silicate, calcium carbonate, magnesium carbonate, dolomite, zinic oxide, titanium oxide, magnesium oxide, iron oxide, molybdenum disulfide, graphite, gypsum, glass beads, glass powders, glass balloons, quartz and quartz glass. The reinforcing fillers may be hollow. They can be used individually or in combination, and may be pretreated, if desired, with a coupling agent such as silane-type and titanium-type coupling agents before use. When at least one among carbon fibers, metallic fibers and graphite is chosen as a filler, the electric resistance value of the resultant molded article per se is reduced. Therefore, the resultant molded article can be preferably protected from attaching fine powders such as dust.

The term "hollow" in the present invention means a space formed in a molded article. It is different from a void and a cell formed by a foaming agent.

The term "rotator" means a functional part having one or more shapes required to exert a function by revolving on an axis of the shaft at any part on the axis, such as a gear, a pulley, a pulley groove, a clutch, a roller, a cam, a cam groove, a key groove, a pit and a notch, and mechanical parts including them.

Hereinafter, preferred hollow injection molding methods in the present invention will be described in detail.

As a first method, there can be given a method for obtaining a hollow molded article by injecting a molten resin into a cavity so as to leave a non-filled part and charging a pressurized fluid into the resin to spread the resin to the non-filled part (e.g., Japanese Patent Application Laid-Open No. 208460/1993 mentioned above). In this method, it is preferred to inject the resin in an amount of 50 to 90%, more preferably 60 to 80%, of the volume of a cavity.

As a second method, there can be mentioned a method for hollow injection molding which comprises charging a pressurized fluid into a molten resin while injecting a predetermined amount of the molten resin into a runner and the like, wherein injection of the resin and charge of the fluid into the cavity are completed at the same time.

According to the above mentioned method, so-called "a co-injection method", a hollow molded article can be obtained without stopping a flow of a resin; therefore, hesitation marks can be prevented. Further, a hollow ratio can be adjusted by an injected amount of a molten resin. This method is effective in hollow molding with a mold in which it is structurally impossible to arrange an additional cavity.

The term "hesitation mark" indicates fine annular concavities and convexities appearing on the surface of a molded article. Hesitation marks appear at a boundary part between a resin part solidified when a molten resin is injected and a resin part solidified when a pressurized fluid is charged. This phenomenon tends to appear on a hollow molded article obtained by a hollow injection molding method comprising the steps of injecting a molten resin so as to leave a non-filled part in a cavity and spreading the resin to the non-filled part by extruding the resin with charging a pressurized fluid into the resin.

In a co-injection method, a pressurized fluid is preferably charged within 20 seconds, more preferably 10 seconds, after the injection of the molten resin.

As a third method, there is given a method comprising injecting a molten resin so as not to leave a non-filled part in a cavity, and charging a pressurized fluid into the resin after the injection of the resin with a mold having an additional cavity linking to a cavity. This molding method is generally called "a full-shot method".

In the full-shot method, a hollow part is formed by charging a pressurized fluid in an amount supplementing the volume reduction of the molten resin so that the hollow part has only the volume equal to the volume reduction of the molten resin. To form a hollow part having a larger volume, Japanese Patent Application Laid-Open No. 121820/1991 discloses a method wherein a mold having an additional cavity is employed.

The term "additional cavity" means a space where a part of a molten resin in a cavity is forwarded when a pressurized fluid is charged into the resin. A hollow ratio of a molded article is easily controlled by adjusting the volume of the additional cavity. This additional cavity is also employed in the two methods mentioned above and a method to be mentioned below.

In a full-shot hollow injection molding method using an additional cavity, a part of a pressurized fluid flows into the passage between the cavity and the additional cavity so that a hollow part continuing from a hollow part of a molded article is formed in the additional cavity according to molding conditions and the volume of a cavity. As a result, there is obtained a molded article whose hollow part along the axis has the same length as the whole length of the molded article along the axis. A difference of cooling periods between the outer surface and the inner surface of the molded article becomes small since the wall of the molded article is thin; as a result, the resin of the whole molded article uniformly contracts. An additional cavity is preferably arranged above the cavity, and linked with the cavity by a passage which is arranged from the top of the cavity along the extension line of the axis. When a mold equipped with a gate and a passage along the extension line of the axis of an article to be molded is employed, a hollow part is preferably formed along the axis and the wall thickness of the resultant molded article is uniform.

In order to let the pressurized fluid flow into the additional cavity more certainly, the volume of the additional cavity is preferably 20 to 60%, more preferably 30 to 50 of the volume of the cavity. When the volume of the additional cavity is 20 to 60% of that of the cavity, a ratio of the length of a hollow part along the axis to the whole length of a molded article along the axis is 80 to 100%.

Further, it is preferable to equip a shut-off valve on a passage linking a cavity and an additional cavity. The term "shut-off valve" means a structure capable of optionally separating and linking the cavity and the additional cavity.

The following is a concrete example how to use a shut-off valve. Firstly, a molten resin is injected into a cavity so as to leave a non-filled part with the shut-off valve closed. Since an additional cavity is separated from the cavity at this time, the molten resin is intercepted from flowing into the additional cavity by an injection pressure. Consequently, a transferability is ensured because a molten resin is fully pressed against the entire cavity wall surface. Then, the cavity and the additional cavity are linked after the pressurized fluid begins to be charged into the molten resin. As a result, a hollow part whose length along the axis direction is 80% or more of that of the molded article is formed.

A shut-off valve is opened preferably within 0 to 10 seconds, more preferably within 0.5 to 5 seconds, from the beginning of the charge of the pressurized fluid. This is because it is necessary to spread a part of the resin injected into a cavity before the resin is cooled and solidified.

The shut-off valve can be driven with any primary drive such as an oil cylinder if the primary drive is capable of adjusting and setting the timing for driving the valve by a signal from an injection molding machine or a gas charging machine.

As a fourth method, there is given a hollow injection molding method for producing a hollow molded article which comprises injecting a resin into a part or the whole part of the space between a nozzle and a gate, and charging a pressurized fluid from a charging port arranged at a point closer to a nozzle than the point to which an amount of the resin required for molding is supplied.

The amount of a filled resin and the position of a charging port are suitably decided depending on the size and thickness of a molded article to be produced, the size of a hollow part and others. The charging port is preferably arranged at a closer point to the nozzle since it is easy to secure an amount of the resin to be injected into a cavity by a pressurized fluid. It is also effective to enlarge volumes of a sprue and a runner for ensuring the amount of a resin to be injected. Further, after the pressurized fluid is charged, the pressure of the fluid is preferably kept for a predetermined period until the pressure of the fluid is released.

According to this hollow injection molding method, there can be obtained a hollow molded article having an excellent appearance even when a crystalline resin such as a polyacetal resin or a resin having a particularly high crystallization velocity, due to a contained filler, is employed. Further, in this method, injection of the resin into a cavity is carried out at a lower and more uniform pressure at a more uniform speed compared to other hollow injection molding methods since the entire resin is injected into the cavity by a pressurized fluid. Therefore, it is possible to obtain a molded article with less warpage. This method is effective for producing a molded article having a high hollow ratio when hollow injection molding is carried out using a mold having a complicated structure, which does not allow for equipping an additional cavity.

FIGS. 2(a) to (c) show one of the examples of this molding method. FIG. 2(a) shows an injection step of a molten resin to fill a part or the whole part of a space between a runner 10 and a gate 14 from a sprue 9 by a molding machine. FIG. 2(b) shows a step of charging a pressurized fluid from a charging port (not shown in the figure) arranged on a runner. At this step, the injected resin is extruded into a cavity to subsequently form a hollow part in the resin. FIG. 2(c) shows a step of maintaining a pressure of the fluid for a certain period, e.g., for 30 seconds. After this step, the pressure of the fluid is released.

In this method, a shut-off valve may be equipped between sprue of a mold and a gate. The location of setting the shut-off valve is preferred to be closer to the gate since an amount of a resin for filling the mold can be enough acquired. For example, the shut-off valve should be arranged at a boundary between the runner and the cavity. This will prevent the resin from flowing in the cavity by firstly closing the valve. Then, the cavity and the runner are linked by opening the valve within 10 seconds after the charge of the pressurized fluid, and thus a molded article having hollow part in the inside can be obtained.

Further, in any of the hollow injection molding methods of the present invention, a single or a plurality of the corners at a gate land and boundary parts between a shaft and a roller is preferably removed.

The term "corner" means a corner on the inner surface of a cavity or the outer surface of a molded article in cross-sectional views of the cavity and the molded article, respectively. Such corners include a corner 15 near a gate land 13 shown in FIG. 3(a), a corner 15 at a boundary part 16 between a shaft and a roller shown in FIG. 4(a), a corner 15 at a boundary part 16 between a shaft and a gear shown in FIG. 4(b), and a corner 15 at a boundary part 16 between a shaft and a cam shown in FIG. 4(c), and, in addition, a corner at a boundary part between gears.

In the hollow injection molding, when a fluid charging port is arranged between a nozzle and the gate, a pressurized fluid passes through the gate to reach the cavity. In this case, the injected resin on and around the corner hardly sustains the pressure of the fluid and is easily extruded towards the tip of the fluid. As a result, thin-walled parts are formed on and around these corners 15 as shown in FIGS. 3(a) and (b). Sometimes, the pressurized fluid leaks from around the corner. Consequently, stable production of molded articles having a desired shape cannot be often achieved. Even if a molded article having a desired shape is obtained, its dimensional accuracy becomes poor since the effect of a pressurized fluid cannot be fully obtained. Further, there is a possibility that the molded article is deteriorated due to insufficient thickness of the resin wall.

The corners of the cavity are removed by, for instance, radiusing or beveling.

The term "radiusing" means to finish the above corners of a cavity so as to be a circular arc. Smooth curves besides arcs are also acceptable.

A case that the corner around the gate of a cavity is radiused is illustrated with FIG. 5. FIG. 5 is a cross-sectional view of a gate land along the axis of a molded article. Numerals 7, 10, 13 and 14 indicate a cavity surface, a runner, a gate land and a gate, respectively.

Symbols A, B, D, E and F individually indicate a point on the surface of a cavity. More precisely, A indicates a point on a cavity surface on the gate side; B and D individually indicate an intersection of the surface of a radiused corner and the surface of the cavity on the gate side; E indicates a boundary between a gate land and a sprue or runner of a mold.

The radiused corner of a cavity is shown in FIG. 5. The radiused corner exhibits its effect when Te satisfies the relationship defined by the following formula:

$$0.1 \text{ mm} \leq Te \leq (\sqrt{2}-1) \times Gt$$

wherein, in FIG. 5, Gt represents the length of segment CE (C is an intersection of segment AB and segment DE); and Te represents the length of segment CF (F is an intersection of the surface of a radiused corner and the bisector of $\angle ACE$).

The above relationship is not limited to the shape of the gate part shown in FIG. 5, and it can be adopted to other shapes of a gate part.

When Te is less than 0.1 mm, effects on prevention of leakage of a pressurized fluid and improvement in strength of a molded article are not sufficiently exhibited. Preferably, Te is 0.5 mm or more. As Te becomes longer, a more sufficient F effect is obtained. However, it is necessary for arrange Te within the above range in view of easiness at gate cut and the appearance of the corner after gate cut.

FIG. 6 is an example of a radiused corner at a boundary between a shaft and a roller and the like. FIG. 6 shows a part of the cross-sectional view of a cavity along the axis of a molded article having a shaft and a roller. Symbols L, M, O, P and Q individually indicate a point on the surface of a cavity whose corner is radiused. In this example, a preferable range for radiusing a corner is expressed by the following formulas:

a) $0.4 \text{ mm} \leq Tg \leq (\sqrt{2}-1)/2 \times (T2-T1)$
   in the case of $5 \text{ mm} \leq T2-T1 \leq T3 \times 2$; and b) $0.4 \text{ mm} \leq Tg \leq (\sqrt{2}-1) \times T3$
   in the case of $5 \text{ mm} \leq T3 \times 2 \leq T2-T1$;

wherein, in FIG. 6, Tg represents the length of segment NQ (N is an intersection of segment LM and segment OP, and Q is an intersection of the surface of a radiused corner and the bisector of $\angle LNP$); T3 represents the length of segment LN; T1 and T2 represent diameters of a shaft part and a roller part, respectively, when both parts are shaped in cylinders; T1 and/or T2 represents the diameter of a pitch circle when both or either part is shaped in a gear; and T1 and/or T2 represents the smallest diameter of a cam when both or either part is shaped in a cam.

The above relationship is not limited to the shape of the cavity shown in FIG. 6, and it can be adopted for other shapes of a cavity.

When Tg is less than 0.4 mm, effects on prevention of leakage of a pressurized fluid and improvement in strength of a molded article are not sufficiently exhibited. Preferably, Tg is 0.5 mm or more. As Tg becomes longer, a more sufficient effect is obtained. However, it is necessary to arrange Tg within the above range in view of easiness at gate cut and the appearance of the corner after gate cut.

The term "beveling" means to replace the corner as mentioned above with an angled straight surface. For instance, as described in FIG. 7, the surface of the cavity having a corner around its gate is finished by replacing the corner with a plane having segment BFD.

The beveling of around the corner of a cavity is illustrated with FIG. 7. FIG. 7 is a cross-sectional view of a gate land along the axis of a molded article, wherein numerals 7, 10, 13 and 14 indicate a cavity surface, a runner, a gate land and a gate, respectively. More precisely, A indicates a point on a cavity surface on the gate side; B and D individually indicate an intersection of the surface of a beveled corner and the surface cavity on the gate side; E indicates a boundary between a gate land and a sprue or runner of a mold. A preferable range for beveling a corner is expressed by the following formula:

$$0.1 \text{ mm} \leq Tf \leq (\sqrt{2}-1) \times Gt$$

wherein, in FIG. 7, Gt represents the length of segment CE (C is an intersection of segment AB and segment DE); and Tf represents the length of segment CF (F is an intersection of a surface the a beveled corner and the bisector of $\angle ACE$).

The above relationship is not limited to the shape of the gate part shown in FIG. 7, and it can be adopted for other shapes of a gate part.

When Tf is less than 0.1 mm, effects on prevention of leakage of a pressurized fluid and improvement in strength of a molded article are not sufficiently exhibited. Preferably, Tf is 0.5 mm or more. As Tf becomes longer, a more sufficient effect is obtained. However, it is necessary to arrange Tf within the above range in view of easiness at gate cut and the appearance of the corner after gate cut.

A case that a corner other than that around the gate of a cavity, i.e., a corner at a boundary between a shaft and a roller, is beveled is illustrated with FIG. 8. FIG. 8 is a part of a cross-sectional view of a molded article having a shaft part and a roller part along its axis. Symbols L, M, O, P and Q individually indicate a point on the surface of a cavity. A preferable range for beveling a corner is expressed by the following formulas:

a) $0.4 \text{ mm} \leq Th \leq \sqrt{2}/4 \times (T5-T4)$
   in the case of $5 \text{ mm} \leq T5-T4 \leq T6 \times 2$;

b) $0.4 \text{ mm} \leq Th \leq \sqrt{2}/2 \times T6$
   in the case of $5 \text{ mm} \leq T6 \times 2 < T5-T4$;

wherein, in FIG. 8, Th represents the length of segment NQ (N is an intersection of segment LM and segment OP, and Q is an intersection of a surface of a beveled corner and a bisector of $\angle LNP$); T6 represents the length of segment LN; T4 and T5 represent diameters of a shaft part and a roller part, respectively, when both parts are shaped in cylinders; T4 and/or T5 represents the diameter of a pitch circle when both or either part is shaped in a gear; and T4 and/or T5 represents the smallest diameter of a cam when both or either part is shaped in a cam.

The above relationship is not limited to the shape of the cavity shown in FIG. 8, and it can be adopted for other shapes of a cavity.

When Th is less than 0.4 mm, effects on prevention of leakage of a pressurized fluid and improvement in strength of a molded article are not sufficiently exhibited. Preferably, Th is 0.5 mm or more. As Th becomes longer, a more sufficient effect is obtained. However, it is necessary to arrange Th within the above range in view of easiness at gate cut and the appearance of the corner after gate cut.

As explained above, radiusing and beveling of corners can prevent a thin-walled part from forming and reduce leakage of a pressurized fluid. Therefore, molded articles can be stably produced.

In the above injection molding methods, conditions for molding an article is decided so that a hollow ratio be preferably 2 to 60%, more preferably 15 to 50%. When the hollow ratio is within this range, hollow injection molding can be stably carried out so that the desired hollow shape is easily formed; preferably, the resultant molded articles do not have poor appearance owing to hesitation marks and the like, and have good dimensional accuracy.

The hollow ratio is defined by the following formula:

$$\text{Hollow ratio } (\%) = \{(V \times \rho - M)/(V \times \rho)\} \times 100$$

In the above formula, V represents the volume of a hollow part when the hollow part is filled with the same resin as the molded article; $\rho$ represents a specific gravity of the resin used; and M represents a mass of the hollow molded article.

To obtain a hollow ratio satisfying the above relationship, known methods are suitably employed. For example, in the case of a full-shot method, a co-injection method and the molding method fourthly described in the above, the satisfactory hollow ratio is obtained by adjusting the volume of an additional cavity, the amount of a resin to be injected, and the volume of a sprue or a runner and the amount of a resin to be injected, respectively.

A ratio of the length of a hollow part along the axis to the whole length of a molded article along the axis is desirably 80% or more, more desirably 90% or more. FIG. 9 is an example of a molded article having a hollow part ratio of 100%, and FIG. 10 shows a cross-sectional view of the molded article of FIG. 9 along its axis.

When a difference between the length of a hollow part along the axis and the whole length of a molded article along the axis is small, the difference in substantial wall thickness between a part where a hollow is formed and a part where a hollow is not formed becomes smaller. As a result, cooling and solidification proceed without a periodical difference.

Therefore, a molding cycle is shortened, which is economically preferable. Further, since the resultant molded article has less parts where a hollow is not formed, the pressure of a fluid is sufficiently transmitted to every part of a molten resin at the molding step. Sink marks and warpage hardly occur; consequently, a desirable molded article having an improved dimensional accuracy is obtained.

Preferable shapes of the molded article of the present invention are illustrated hereinafter.

First, it is preferred that the shortest and longest distances between the axis and the inner surface of a molded article in a cross-section vertical to the axis of the molded article satisfy the following relationship:

$$0 \leq (d1-d2)/d1 \leq 0.1$$

In the above formula, d1 and d2 indicate the longest distance and the shortest distance between the axis and the inner surface of a molded article, respectively. When the hollow part formed inside the molded article satisfies the above relationship, the center of gravity of the molded article almost accords with the center of its axis. As a result, run-out is preferably reduced.

Second, ruggedness or grooves such as a cam groove and a key groove which is necessary for a roller to work as a rotator is preferably arranged on the roller to give the plural functions to a sole part. When ruggedness or a grooves such as a cam groove is arranged on a part or the whole of the surface of a molded article, they are preferably arranged so as to satisfy the following relationship:

$$0.7 \leq (R2-r2)/(R1-r1) \leq 1$$

In the above formula, R1, R2, r1 and r2 are defined as follows.

In the cross-section vertical to the axis of a molded article having grooves on its surface, R1 and R2 indicate the longest distance and the shortest distance between the center of the axis and the outer surface of a molded article, respectively; and r1 and r2 indicate the longest distance and the shortest distance between the center of the axis and the inner surface of a molded article, respectively.

To prevent leakage of a pressurized fluid, corners of the grooves are preferably removed by, for instance, radiusing. In the case that a cam groove is arranged, the edge of the cam groove is radiused.

BRIEF DESCRIPTION OF THE DRAWINGS

FIG. 1(a) shows a diagrammatic view of the gate of a mold having a pressurized fluid charging port in its cavity. FIG. 1(b) shows a cross-sectional view along the axis of the molded article obtained by using the mold disclosed in FIG. 1(a). FIG. 1(c) shows a cross-sectional view vertical to the axis of the molded article of FIG. 1(b) taken along line A–A'.

FIG. 4(a) shows a boundary part between a shaft part and a roller part. FIG. 4(b) shows a boundary part between a shaft part and a gear part. FIG. 4(c) shows a boundary part between a shaft part and a cam part.

Figure 2A:
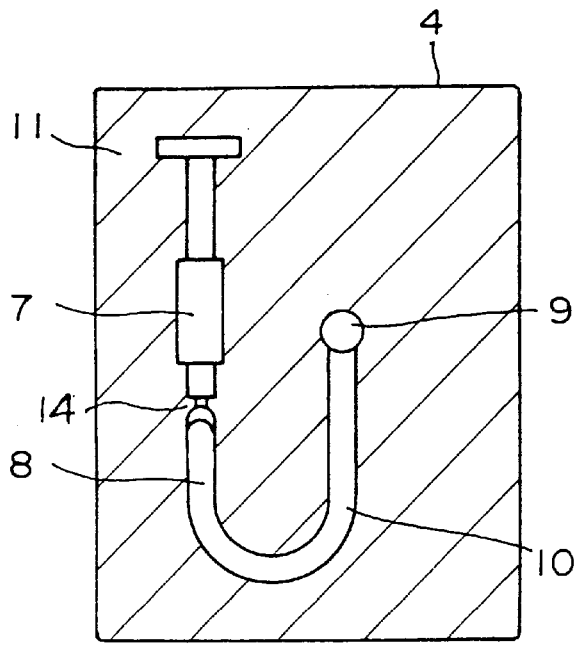
FIGS. 2(a) to (c) show one example of the process for hollow injection molding of the present invention.

| Description of Numerals | |
|---|---|
| 1: fluid/gas charging port | 2: supply pipe |
| 3: center of axis | 4: mold |
| 5: axis | 6: hollow part |
| 7: cavity | 8: molten resin |
| 9: sprue | 10: runner |
| 11: mold parting face | 12: resin part |
| 13: gate land | 14: gate |
| 15: thin-wall part (corner) | 16: boundary part |
| 17: shaft | 18: roller part |
| 19: gear part | 20: cam part |
| 21: radiused corner | 22: beveled corner |
| 23: gate | 24: entrance of passage |
| 25: groove | 26: additional cavity |
| 27: passage to additional cavity | |
| 28: shut-off valve | |

BEST MODE FOR CARRYING OUT THE INVENTION

[Resin and Condition to be Employed]

The following resins were employed to carry out injection molding and hollow injection molding in Examples and Comparative Examples.

Polyacetal copolymer resin:
  Tenac®-C 4520 manufactured by Asahi Chemical Industry Co., Ltd.
Polyacetal copolymer resin containing glass fibers:
  Tenac®-C GN755 (wherein glass fibers are mixed at a ratio of 75 to 25) manufactured by Asahi Chemical Industry Co., Ltd.
Polyacetal type resin:
  Lynex®-T TFC67N manufactured by Asahi Chemical Industry Co., Ltd.

Nylon 66 (polyamide 66) resin:
  Leona® 1402S manufactured by Asahi Chemical Industry Co., Ltd.
Modified PPE resin:
  Xyron® 500Z manufactured by Asahi Chemical Industry Co., Ltd.
ABS resin:
  Stylac®-ABS 101 manufactured by Asahi Chemical Industry Co., Ltd.

When a polyacetal resin or a polyacetal type resin was injection molded or hollow injection molded, the temperatures of a cylinder of a molding machine and a mold were set at 200° and 80° C., respectively.

When a modified PPE resin was injection molded or hollow injection molded, the temperatures of a cylinder of a molding machine and a mold were set at 280° and 80° C., respectively.

When an ABS resin was injection molded or hollow injection molded, the temperatures of a cylinder of a molding machine and a mold were set at 230° C. and 40° C., respectively.

[Molding Machine] A molding machine used in Examples was equipped with a shut-off valve on the screw (hopper) side of a gas charging port in order to prevent a gas from flowing back into a cylinder.

[Pressurized Fluid]

A nitrogen gas was employed as a pressurized fluid to be charged into a resin. The gas pressure was decided in each Example or Comparative Example.

[Evaluation of Properties of Molded Article]

A molded article was evaluated by measuring properties which were randomly selected from a hollow shape, roundness, magnitude of run-out, roughness of a roller surface, breaking strength. The measuring devices and methods were as follows:

Measurement of size of hollow part:
  The size of a section vertical to the axis was obtained by cutting the shaft-unified type rotator at an optional point, measuring distances from the center of the shaft to the internal wall of the rotator, defining the longest distance and the shortest distance as d1 and d2, respectively, and obtaining the ratio of the difference between d1 and d2 to d1.
  The size of a section in the direction of the axis was obtained by cutting the shaft-unified type rotator along with the axis, measuring whole length of the rotator along the axis and length of the hollow part, and obtaining a ratio of the length of the hollow part to the whole length of the rotator.

Measurement of roundness:
  Using a roundness measuring device RA-424 manufactured by Mitsutoyo Corp., the roundness was measured at measured points of the resultant shaft-unified type rotator.

Magnitude of run-out:
  Using a roundness measuring device RA-424 manufactured by Mitsutoyo Corp., the magnitude of run-out was measured at optionally selected three points on the resultant shaft-unified type rotator. The magnitudes at two points among the three points were defined as a standard, and the magnitude at the center was defined as a measured value.
    When the above roundness measuring device is used, measurement cannot be often carried out at a magnitude of run-out of about 300 μm or more depending on the shapes of the molded article.
    Therefore, samples which could not be measured by the measuring device were measured again using a dial gauge.

Roughness of roller surface:
  A machine for measuring surface roughness SURFCOM 575A manufactured by Tokyo Seimitsu Co., Ltd. was employed. A measured value of maximum height (Rmax) (μm) was defined as the roughness according to JIS B 0601-1982.

Breaking strength:
  The breaking strength was measured with a universal testing machine Model 1185 manufactured by Instron Corp.
  Both ends of the roller were fixed and a load was put on the center of the roller to measure a breaking load at a boundary part.

EXAMPLES 1 TO 4

Figure 9:
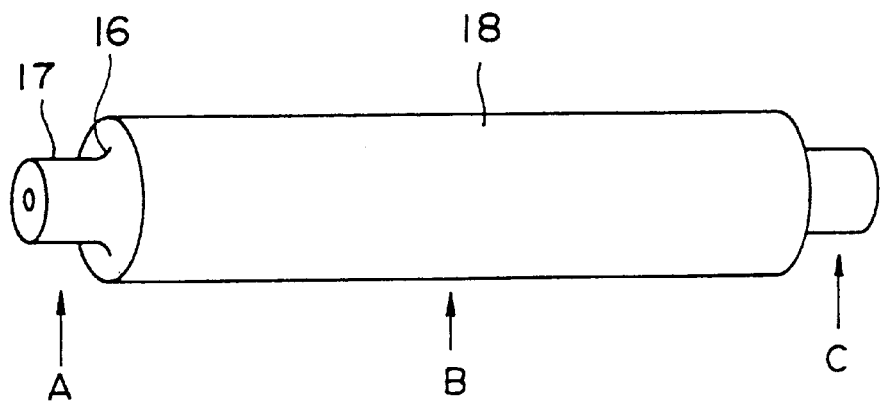
FIG. 9 shows one example of the molded articles of the present invention.
Figure 10:
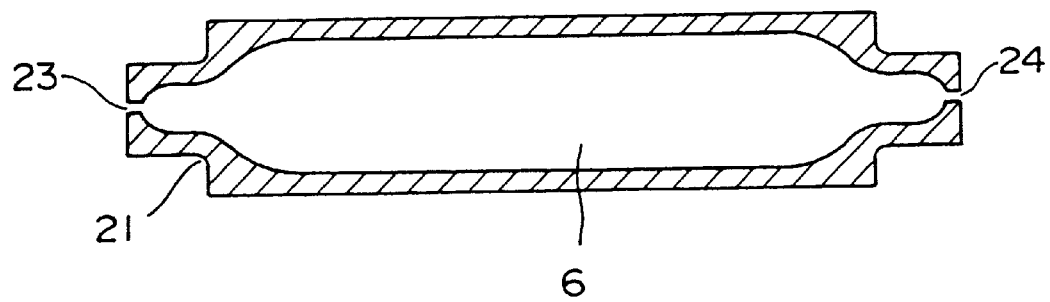
FIG. 10 shows a cross-sectional view of the molded article of FIG. 9.
Figure 11A:
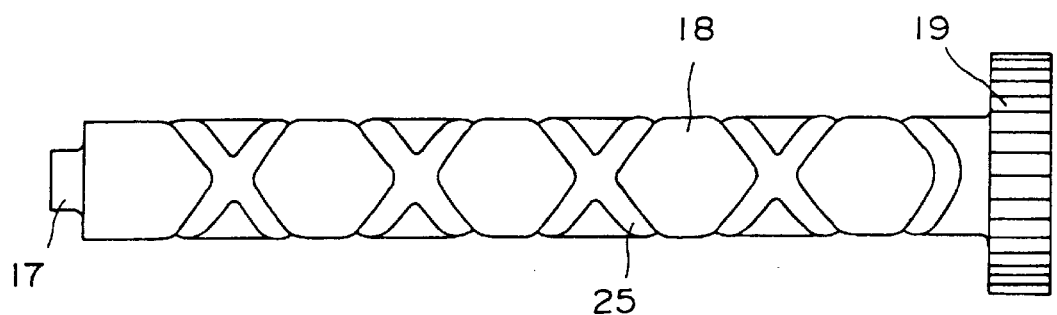
FIG. 11(a) shows an external appearance of one of molded articles having grooves which is obtained by the present invention.
Figure 11B:
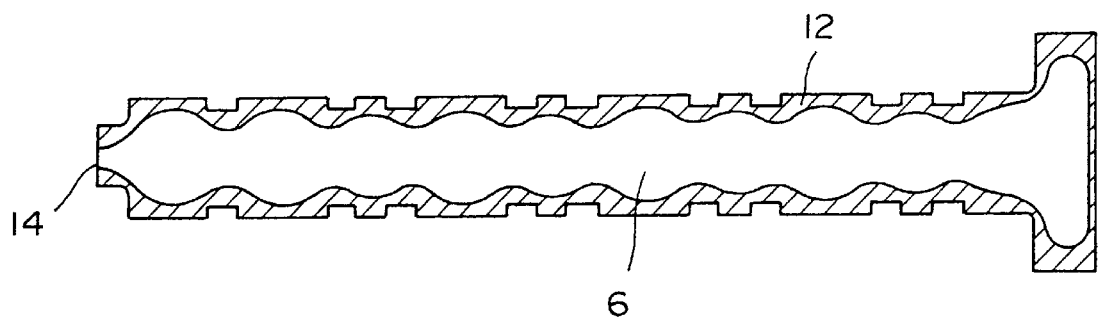
FIG. 11(b) shows a cross-sectional view along the axis of the molded article of FIG. 11(a).
Figure 11C:
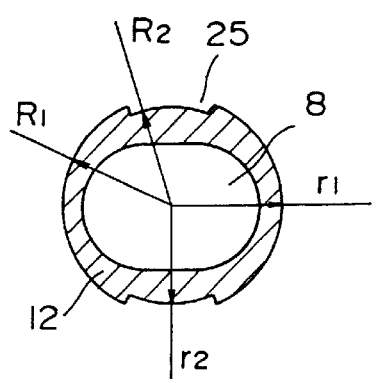
FIG. 11(c) shows a cross-sectional view vertical to the axis of the molded article of FIG. 11(a).
Figure 12:
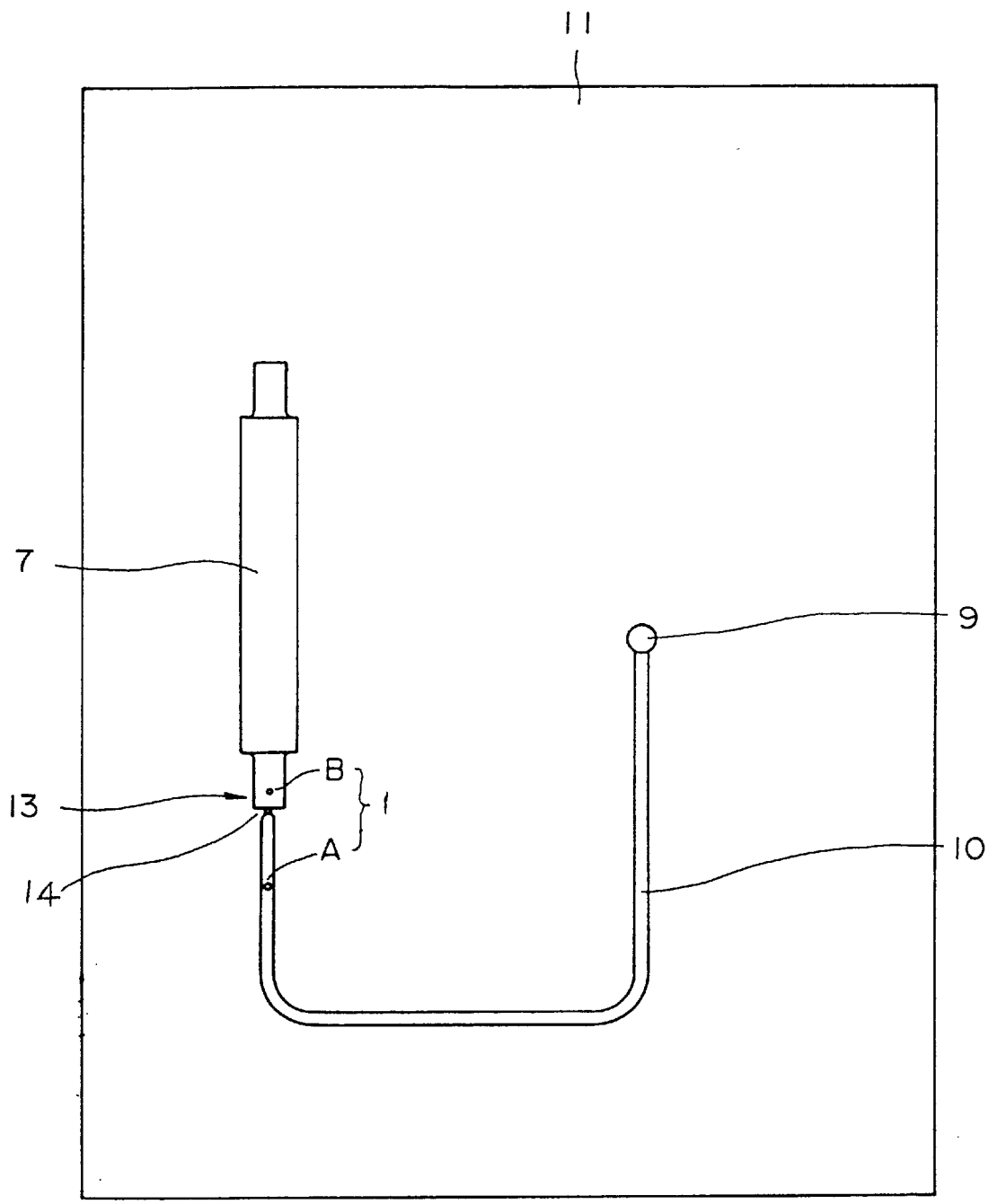
FIG. 12 shows a parting face of a mold which is used in Examples 1 to 13 of the present invention.

A mold capable of forming a shaft-unified type roller comprising a roller part 18 and a shaft part 17 as shown in FIG. 9 was employed. The mold had, as shown in FIG. 12, a cavity 7 so that the axis of the shaft-unified type roller be vertical, and a gate 14 equipped at the intersection of the bottom of the cavity and the axis.

The hollow injection molding was carried out using resins listed in Table 1 according to the following steps.

On the first step, a resin was injected into the cavity 7 in an amount corresponding to 70% of the internal volume of the cavity using an injection molding machine.

On the second step, a nitrogen gas pressurized to 150 kg/cm$^2$ was charged into the resin for 5 seconds through a pressurized gas charging port (not shown in Figures) arranged at a nozzle part linking to a sprue 9 of the molding machine 0.5 second after the injection of the resin on the first step.

On the third step, the pressure of the nitrogen gas charged into the resin on the second step was maintained for 30 seconds. After the third step, the pressure of the nitrogen gas was released. A molding cycle was about 45 seconds.

The resultant shaft-unified type rollers were evaluated concerning a hollow shape, roundness, run-out. The size of the hollow part was measured at the section obtained by cutting the roller at point B in FIG. 9. The roundness was measured at points A, B and C on the roller shown in FIG. 9. The magnitude of run-out was measured at points A, B and C on the roller. The magnitude at points A and C were defined as a standard, and the magnitude at point B was defined as a measured value. The results of the measurement are shown in Table 1.

COMPARATIVE EXAMPLES 1 TO 4

Figure 13:
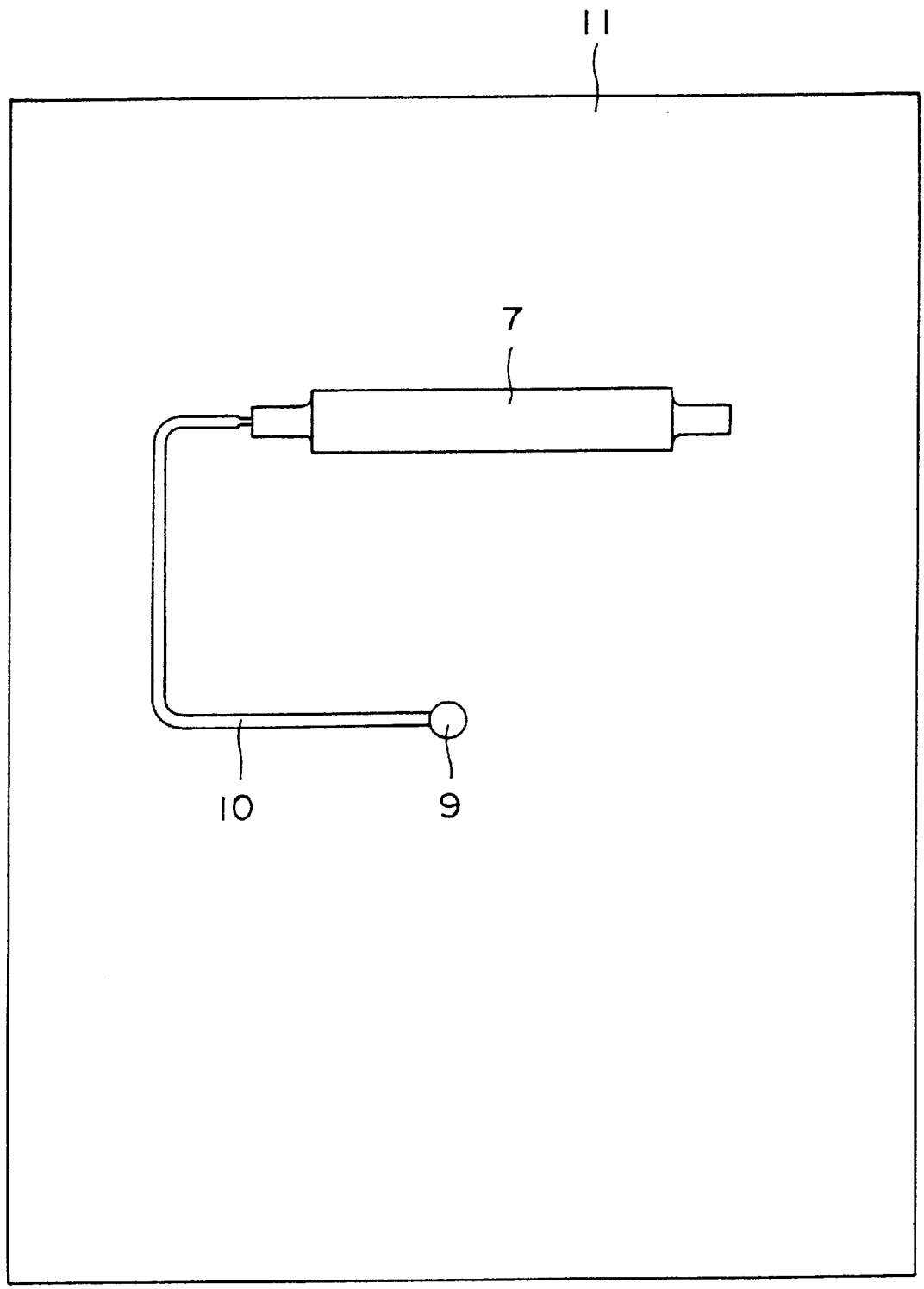
FIG. 13 shows a parting face of a mold which is used in Comparative Examples 1 to 4 of the present invention.

A mold capable of forming a shaft-unified type roller as shown in FIG. 9 was employed. As shown in FIG. 13, a cavity 7 was arranged in the mold so that the axis of the shaft-unified type roller be horizontal. Shaft-unified type rollers were obtained with the same resins under the same conditions as in Examples 1 to 4 except that the structure of the mold was different. The results of the measurement are shown in Table 1.

EXAMPLES 5 TO 13

Hollow injection molding was carried out using the mold employed in Examples 1 to 4 and resins listed in Table 2 according to the following steps.

The pressurized gas charging port 1 was arranged at a nozzle part of a molding machine (not shown in Figures) in Examples 5, 8, and 11; at a runner 10 of the mold (position A in FIG. 12) in Examples 6, 9 and 12; and in the cavity 7 of the mold (position B in FIG. 12) in Examples 7, 10 and 13.

On the first step, a resin was injected into the cavity 7 in an amount corresponding to 70% of the inner volume of the cavity using an injection molding machine.

On the second step, a nitrogen gas pressurized to 100 kg/cm$^2$ was charged into the resin for 5 seconds through one of the pressurized gas charging ports arranged at a nozzle part, at a runner and in the cavity 0.5 second after the injection of the resin on the first step.

On the third step, the pressure of the nitrogen gas charged into the resin on the second step was maintained for 30 seconds. After the third step, the pressure of the nitrogen gas was released to take out a molded article from the mold. A molding cycle was about 45 seconds.

The resultant molded articles were evaluated according to the same manner as in Examples 1 to 4. The results of the measurement are shown in Table 2.

EXAMPLES 14 TO 16

Figure 15:
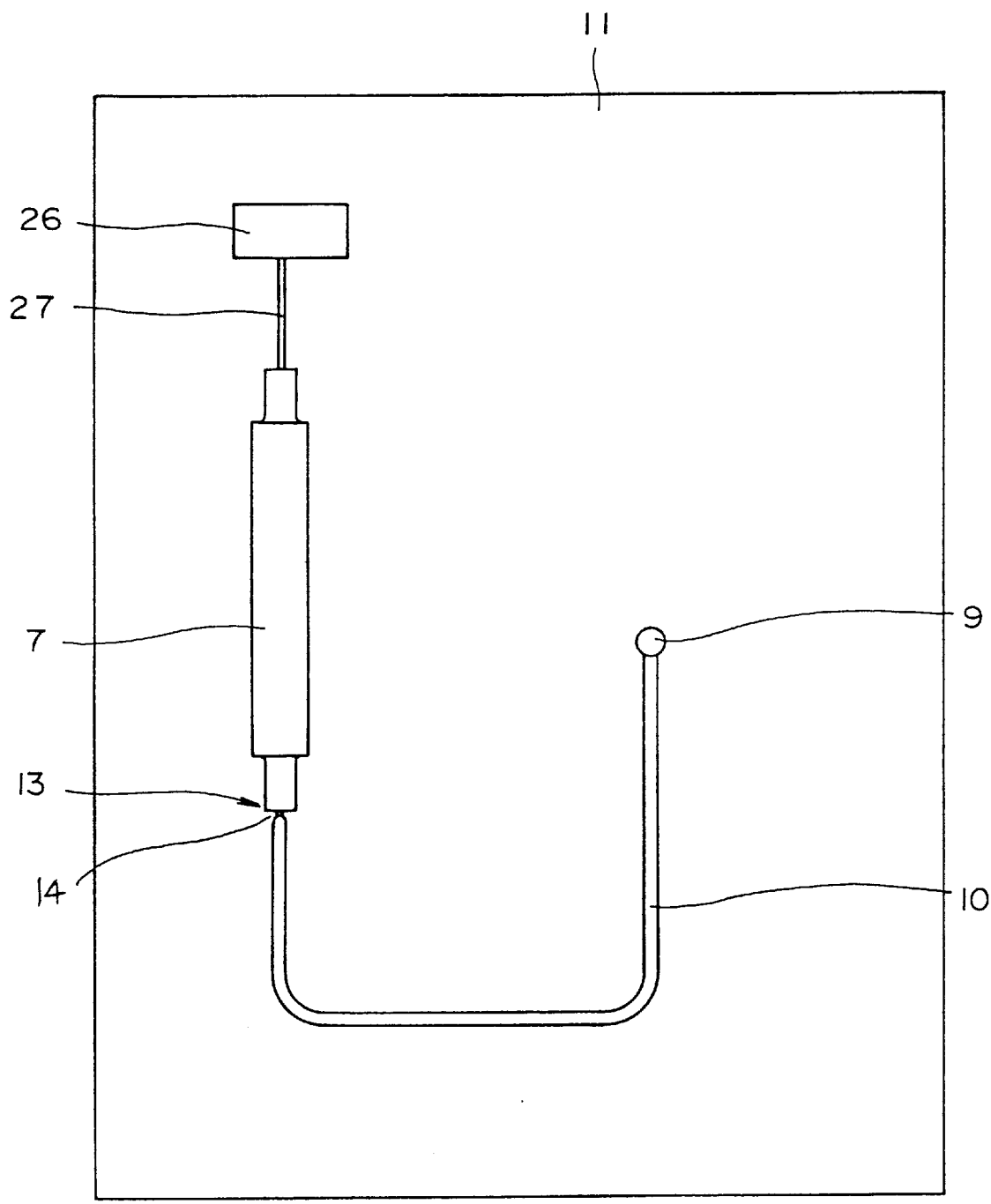
FIG. 15 shows a parting face of a mold which is used in Examples 14 to 16 of the present invention.

A mold capable of forming a shaft-unified type roller comprising a roller part 18 and a shaft part 17 as shown in FIG. 12 was employed. The mold had, as shown in FIG. 15, a cavity 7 arranged so that the axis of the shaft-unified type roller may be vertical, and a circular gate 14 equipped at the intersection of the bottom of the cavity and the axis.

An additional cavity 26 was arranged above the cavity 7, and linked with the cavity by a passage 27 which was arranged from the top of the cavity along the extension line of the axis. The volume of the additional cavity was 40% of that of the cavity.

Full-shot hollow injection molding was carried out according to the following steps.

On the first step, a resin was injected into the cavity 7 so as not to leave a non-filled part.

On the second step, a nitrogen gas pressurized to 150 kg/cm$^2$ was charged into the resin for 5 seconds through a pressurized gas charging port (not shown in Figures) arranged at a nozzle part of the molding machine 0.5 second after the injection of the resin on the first step.

On the third step, the pressure of the nitrogen gas charged into the resin on the second step was maintained for 30 seconds. After the third step, the pressure of the nitrogen gas was released. A molding cycle was about 45 seconds.

When the hollow size of the resultant molded articles was measured, the results were similar to those of the molded articles obtained in Examples 1 to 4.

Figure 14:
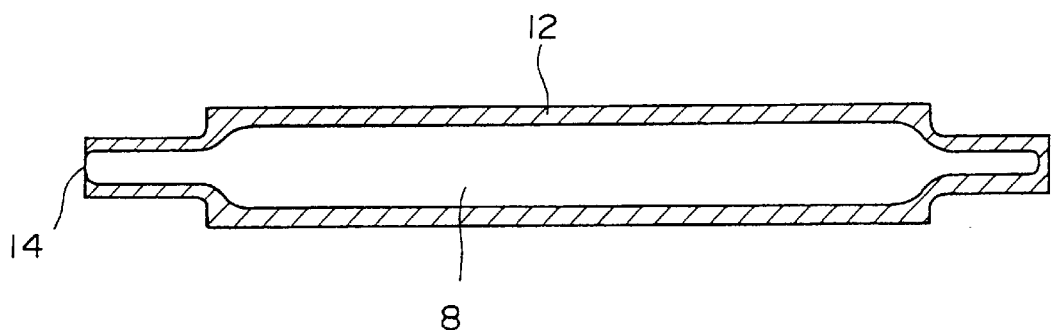
FIG. 14 shows a cross-sectional view along the axis of a roller obtained in Examples 14 to 16 of the present invention.

Further, the resultant molded articles were also evaluated concerning whole length of a hollow part along the axis of the molded article, roundness, run-out. The roundness was measured at points A, B and C on the molded article in FIG. 9. The magnitude of run-out was measured at points A, B and C on the molded article. The magnitude at points A and C were defined as a standard, and the magnitude at point B was defined as a measured value. The results of the measurement are shown in Table 3. FIG. 14 is a cross-sectional view along the axis of the hollow molded article.

EXAMPLES 17 TO 19

Figure 16:
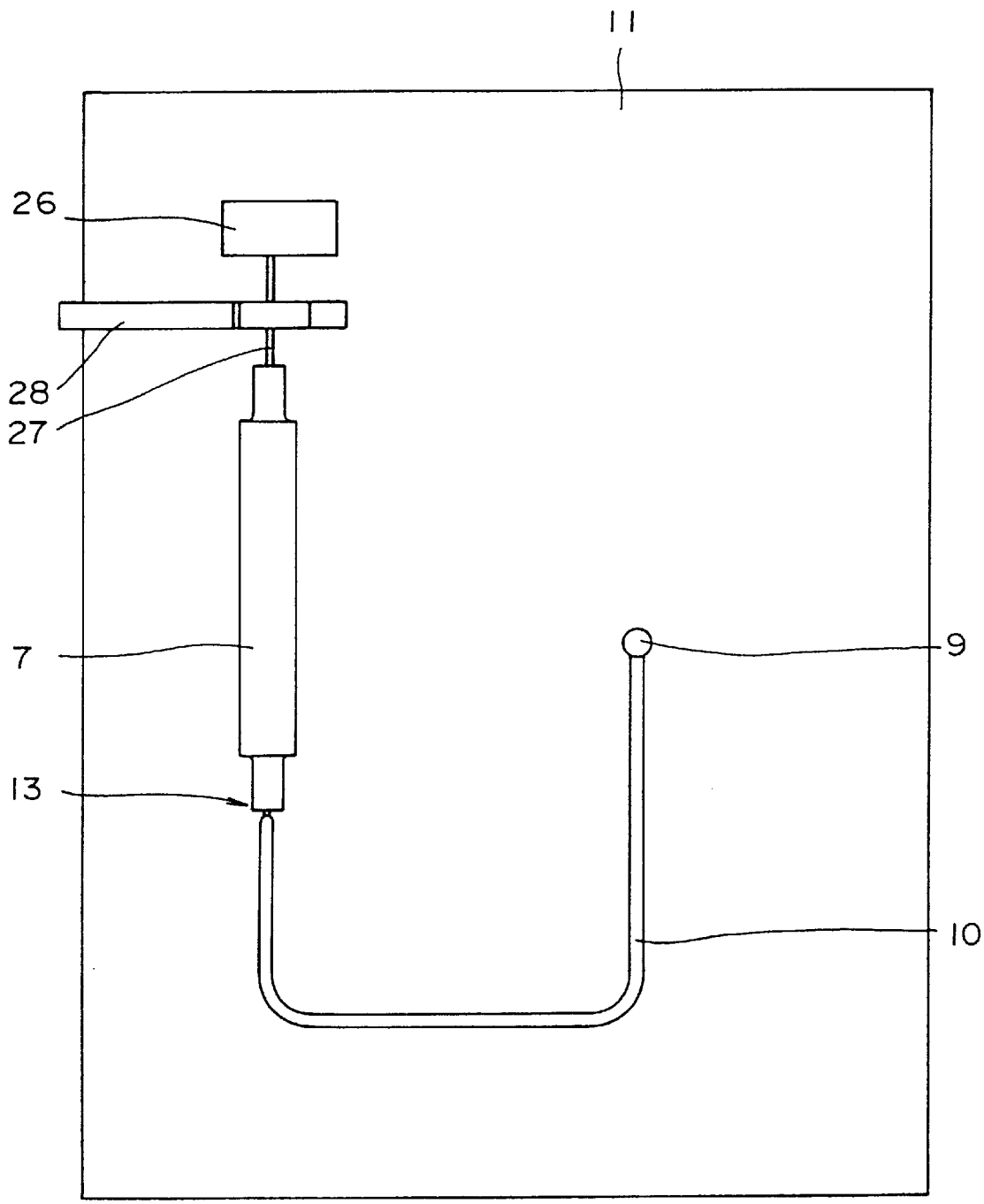
FIG. 16 shows a parting face of a mold which is used in Examples 17 to 19 of the present invention.

A mold capable of forming a shaft-unified type roller shown in FIG. 9 was employed as well as Examples 14 to 16 to carry out full-shot injection molding. The mold has, as shown in FIG. 16, a cavity 7 arranged so that the axis of the cavity may be vertical, and a gate land 13 equipped at the intersection of the bottom of the cavity and the axis. Further, an additional cavity 26 was arranged above the cavity 7, and linked to it with a passage 27 from the top of the cavity along the extension line of the axis. The shape of the passage 27 was circular. A shut-off valve 28 operated with a hydraulic cylinder was arranged around the middle of the passage 27. Resins listed in Table 3 were employed. The volume of the additional cavity was 40% of that of the cavity.

Hollow injection molding was carried out according to the following steps.

On the first step, a resin was injected, in a state that the cavity 7 and the additional cavity 26 were separated by the shut-off valve 28, so as not to leave a non-filled part in the cavity.

On the second step, a nitrogen gas pressurized to 150 kg/cm$^2$ was charged into the resin for 5 seconds through a pressurized gas charging port (not shown in Figures) arranged at a nozzle part of the molding machine 0.5 second after the injection of the resin on the first step.

On the third step, 0.5 second after the nitrogen gas began to be charged into the resin, the shut-off valve 28 was opened to link the cavity 7 and the additional cavity 26. A hollow part 6 was formed in the resin in the cavity 7 while extruding a part of the resin into the additional cavity 26.

On the fourth step, the pressure of the nitrogen charged into the resin on the third step was maintained for a certain period. After the fourth step, the pressure of the nitrogen gas was released to take out a molded article from the mold. A molding cycle was about 45 seconds.

When the hollow size of the resultant molded articles was measured, the results were similar to those of the molded articles obtained in Examples 1 to 4.

Figure 17:
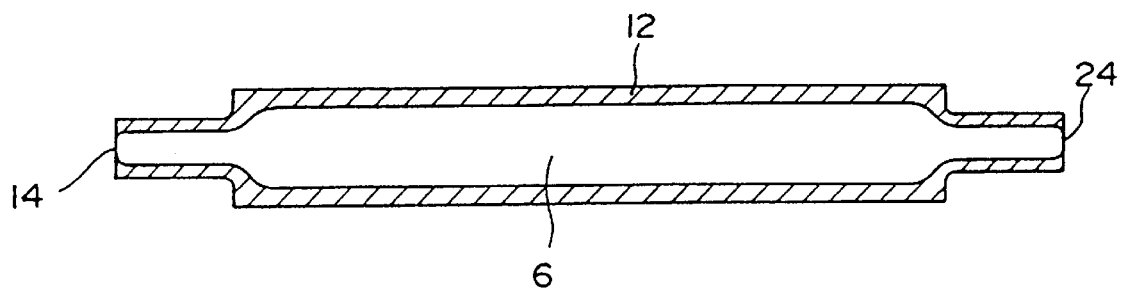
FIG. 17 shows a cross-sectional view along the axis of a roller obtained in Examples 17 to 19 of the present invention.

Further, the resultant molded articles were also evaluated according to the same manner as in Examples 14 to 16. The results are shown in Table 3. FIG. 17 is a cross-sectional view along the axis of the resultant hollow molded article.

EXAMPLES 20 AND 21

Figure 18:
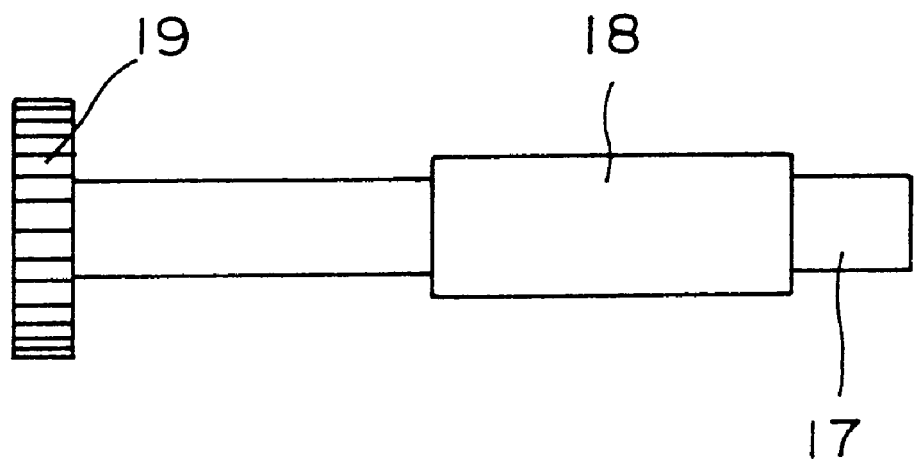
FIG. 18 shows a roller with a gear obtained in Examples 20 to 25 of the present invention.
Figure 19:
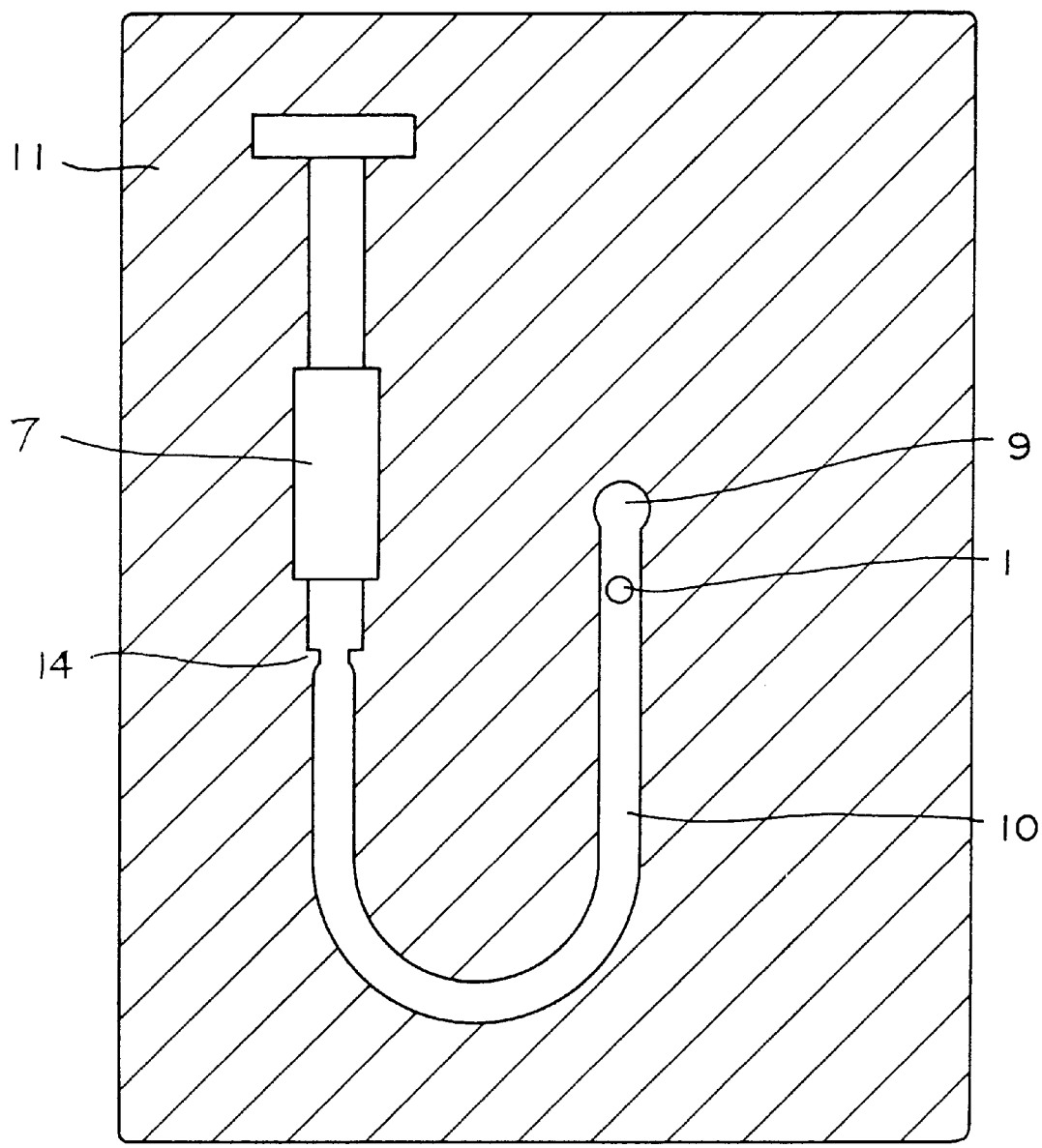
FIG. 19 shows a parting face of a mold which is used in Examples 20 to 21 of the present invention.

A mold capable of forming a shaft-unified type roller comprising a roller part 18, a shaft part 17 and a gear part 19 as shown in FIG. 18 was employed. The mold had, as shown in FIG. 19, a cavity 7 arranged so that the axis of the shaft-unified type roller be vertical, a gate 14 equipped at the intersection of the bottom of the cavity and the axis, and a pressurized gas charging port 1 at a runner 10. Resins listed in Table 4 were employed to carry out hollow injection molding according to the steps (a), (b) and (c) shown in FIG. 20.

Figure 20A:
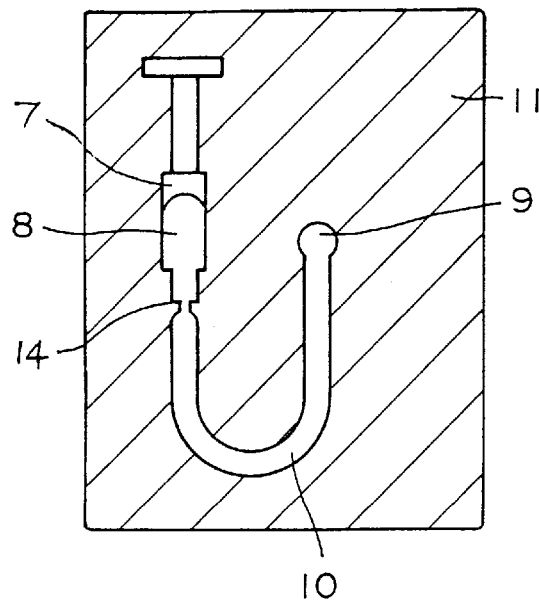
FIGS. 20(a) to (c) show schematic view indicating the molding process of Examples 20 to 21 of the present invention.

On the first step, a resin was injected into the cavity 7, as shown in FIG. 20(a), in an amount corresponding to 70% of the inner volume of the cavity.

Figure 20B:
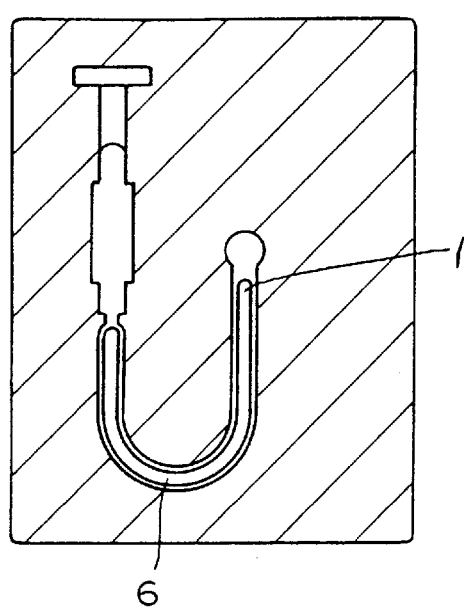

On the second step, as shown in FIG. 20(b), a nitrogen gas was charged into the resin through a pressurized gas charging port 1 arranged at a runner 10 during the injection of the resin to form a hollow molded article in the 4) cavity 7.

Figure 20C:
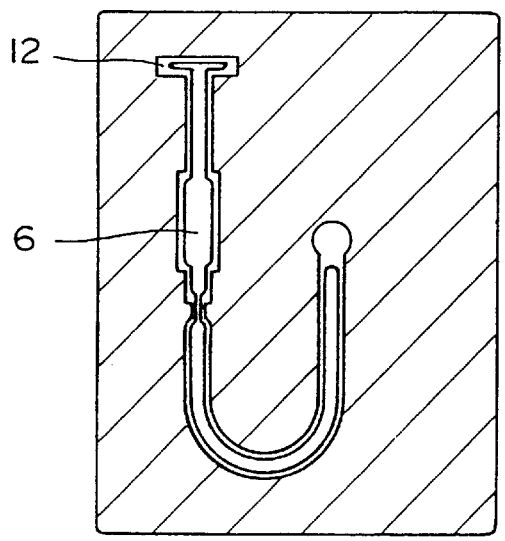
Figure 21:
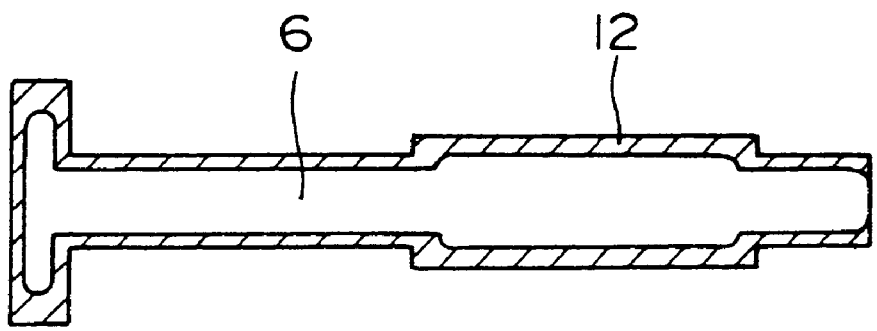
FIG. 21 shows a cross-sectional view along the axis of the roller obtained by using the mold disclosed in FIG. 19.

On the third step, the pressure of the nitrogen charged into the resin was maintained for 30 seconds as shown in FIG. 20(c). After the third step, the pressure of the nitrogen gas was released. A molding cycle was about 45 seconds. FIG. 21 is a cross-sectional view of the resultant hollow molded article.

The resultant molded articles were evaluated concerning surface roughness of the roller part 18 as shown in FIG. 18.

The results are shown in Table 4. Further, other properties (the size of a hollow part, roundness and magnitude of run-out) were evaluated, and the results were similar to those of the molded articles obtained in Examples 1 to 4.

EXAMPLES 22 AND 23

Figure 2B:
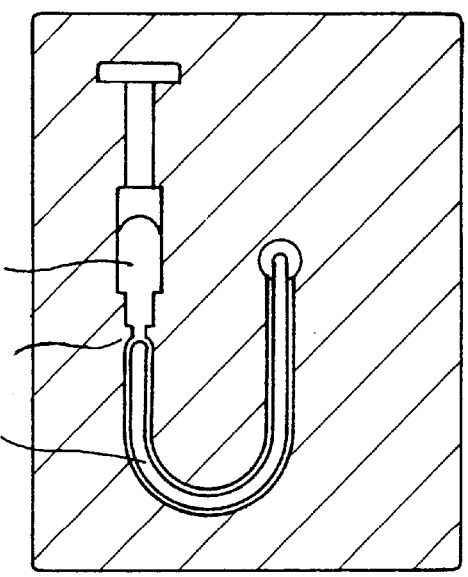
Figure 2C:
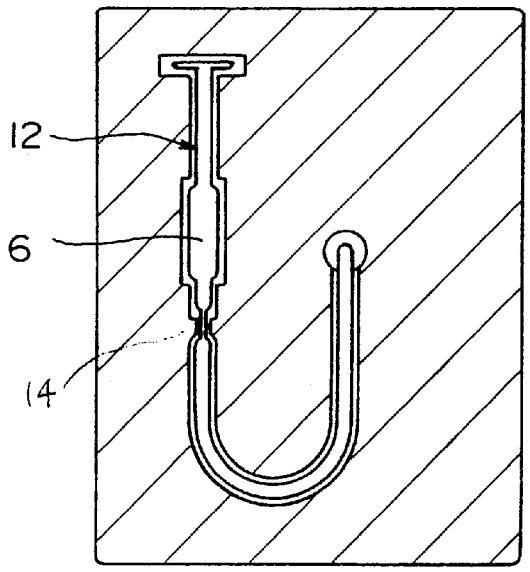
Figure 3A:
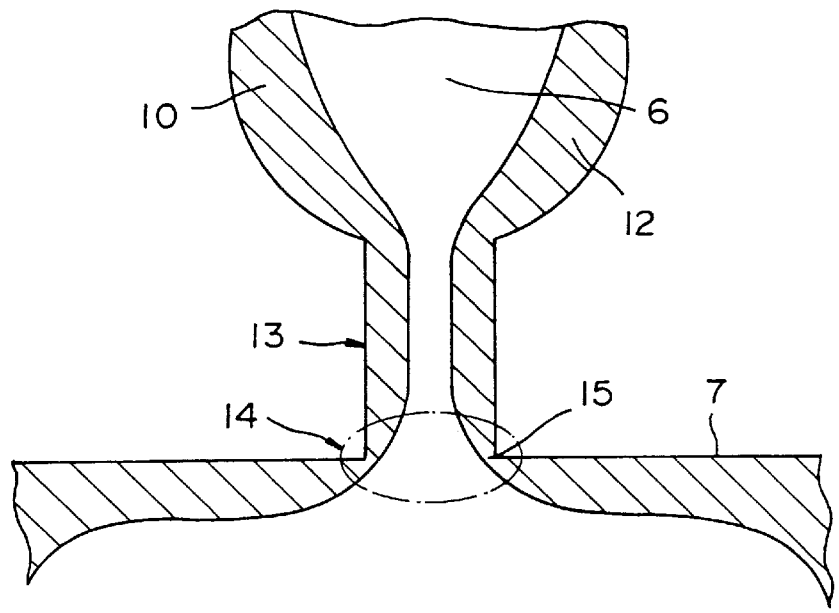
FIG. 3(a) shows a cross-sectional view of the vicinity of the gate, where a corner is not removed, of a mold.
Figure 3B:
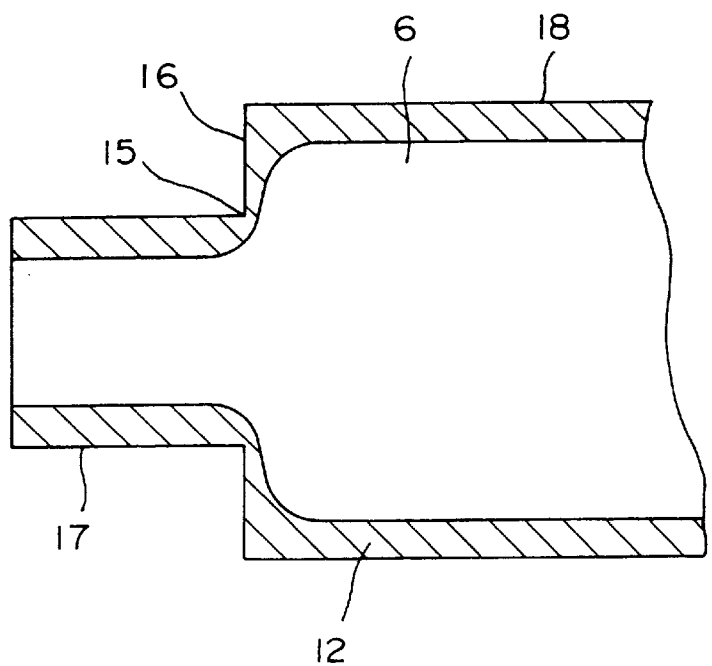
FIG. 3(b) shows a cross-sectional view of the molded article which is obtained with the mold of FIG. 3(a).
Figure 4A:
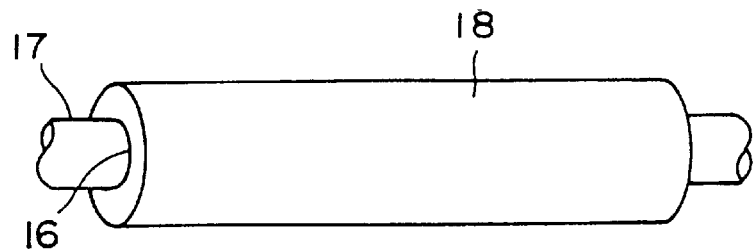
FIGS. 4(a) to (c) show examples of molded articles obtained by the hollow injection molding of the present invention.
Figure 4B:
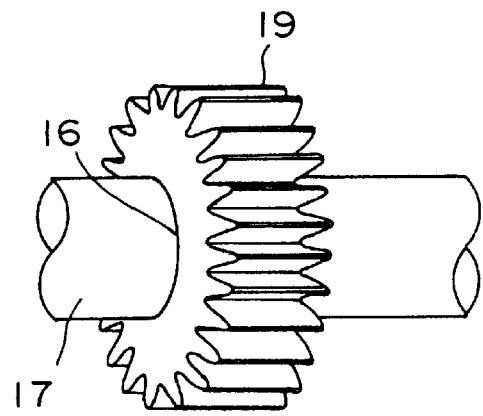
Figure 4C:
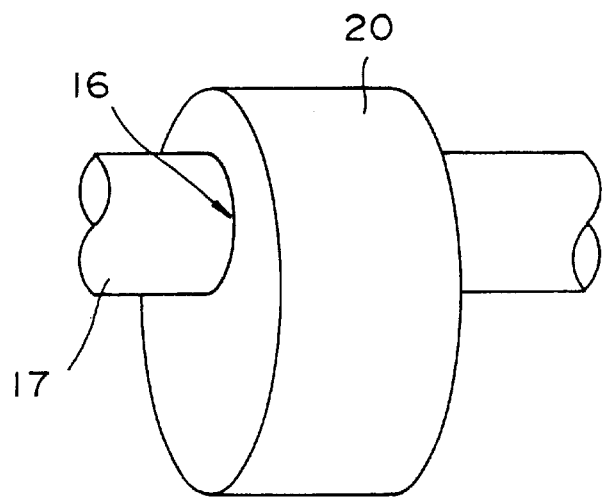
Figure 22:
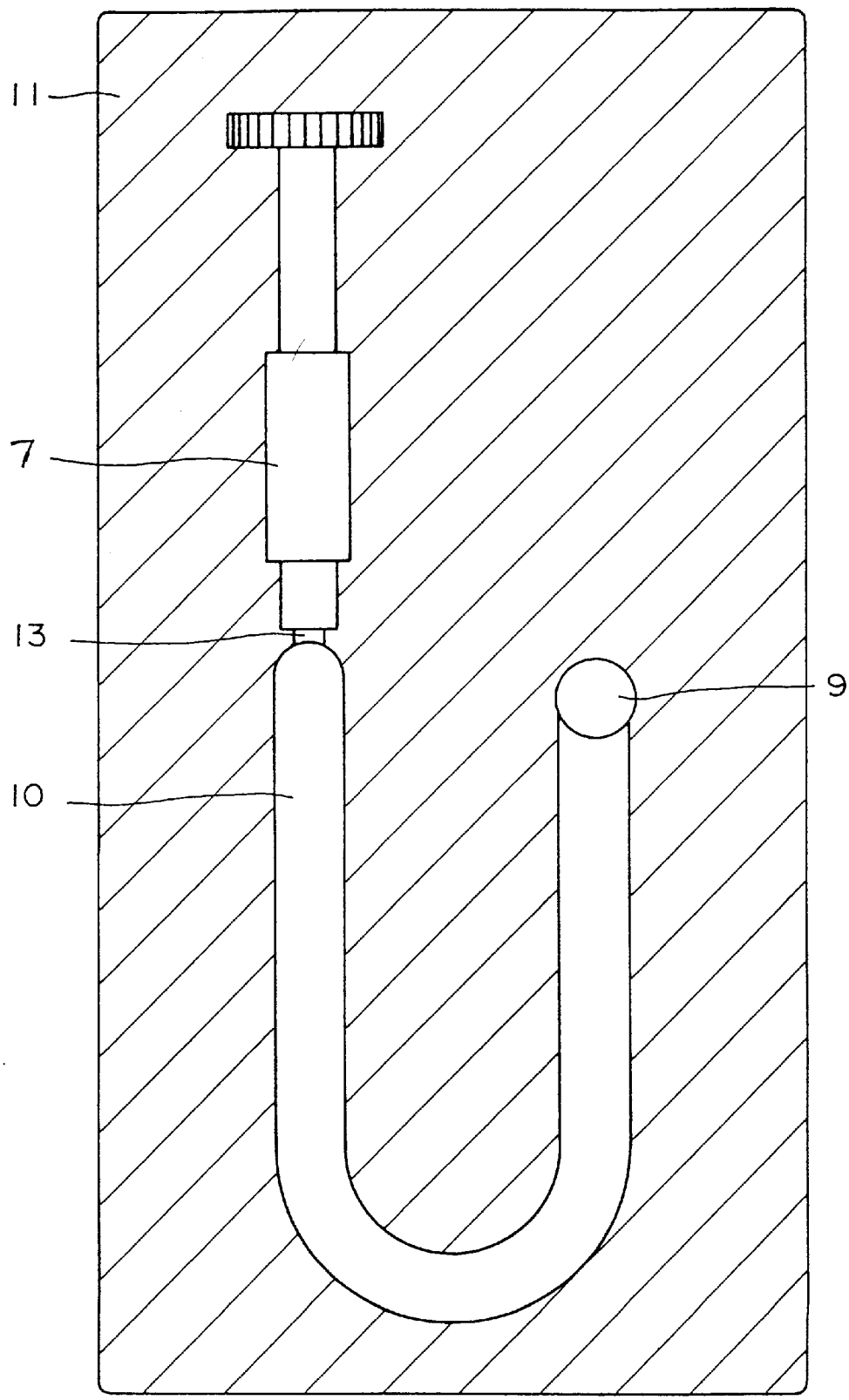
FIG. 22 shows a parting face of a mold which is used in Examples 22 and 23 of the present invention.

As shown in FIG. 22, the same mold as in Examples 20 and 21 except that a gas charging port was not equipped at the runner 10 was employed to carry out hollow injection molding using resins listed in Table 4 in accordance with the steps shown in FIGS. 2(a), 2(b) and 2(c).

On the first step, as shown in FIG. 2(a), a resin was injected into the mold through the sprue 9 to fill the runner 10.

On the second step, as shown in FIG. 2(b), a part of the resin at the sprue 9 and in the runner 10 were extruded into the cavity 7 by charging a nitrogen gas from a pressurized gas charging port equipped at the nozzle part of the molding machine.

On the third step, the pressure of the nitrogen charged into the resin was maintained for 30 seconds as shown in FIG. 2(c). After the third step, the pressure of the nitrogen gas was released to take out a molded article from the mold. A molding cycle was about 45 seconds.

The resultant molded articles were evaluated according to the same manner as in Examples 20 and 21. The results are shown in Table 4. Further, other properties (the size of a hollow part, roundness and magnitude of run-out) were evaluated, and the results were similar to those of the molded articles obtained in Examples 1 to 4.

EXAMPLES 24 AND 25

Figure 23:
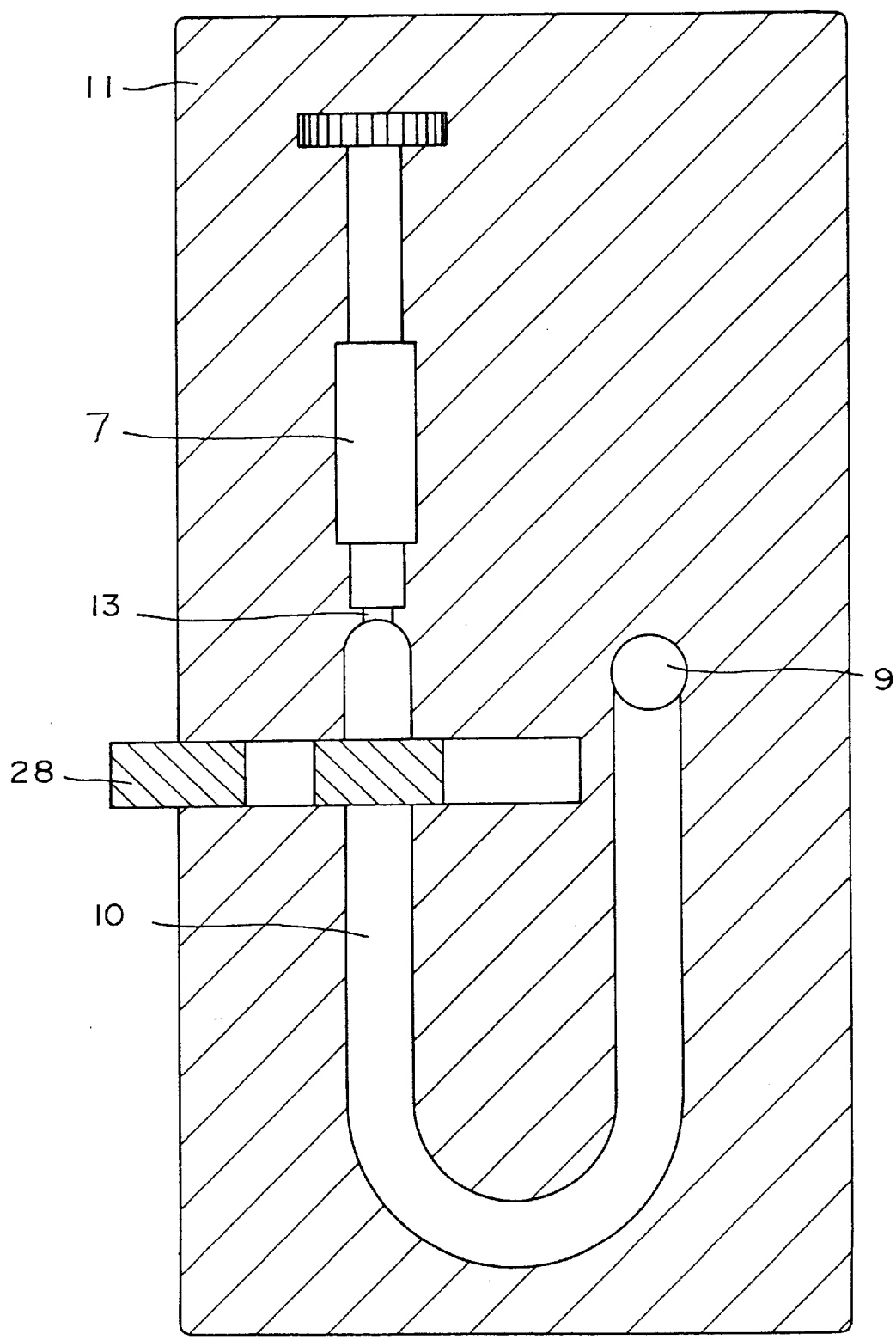
FIG. 23 shows a parting face of a mold which is used in Examples 24 and 25 of the present invention.
Figure 24A:
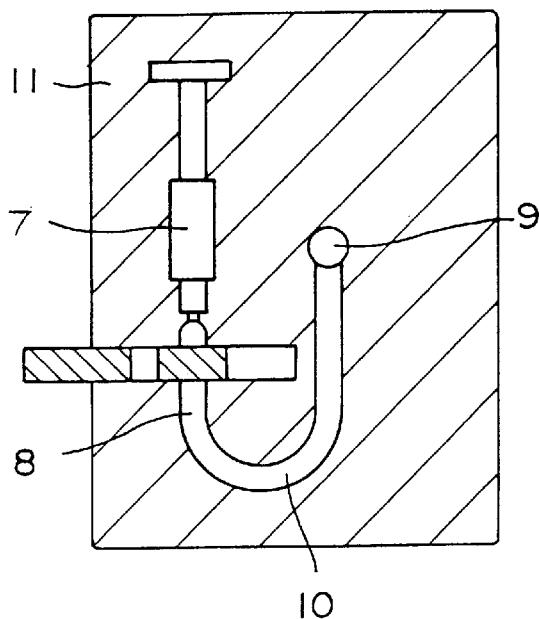
FIGS. 24(a) to (c) shows schematic views indicating the molding process of Examples 24 and 25 of the present invention.

As shown in FIG. 23, the same mold as in Examples 20 to 23 except that a shut-off valve 28 arranged on the runner 10 was employed to carry out hollow injection mold using resins listed in Table 4 in accordance with the steps shown in FIGS. 24(a), (b) and (c).

On the first step, as shown in FIG. 24(a), a resin was injected into the mold through the sprue 9 of a molding machine in a state that the shut-off valve arranged on the runner 10 was closed to fill the runner.

Figure 24B:
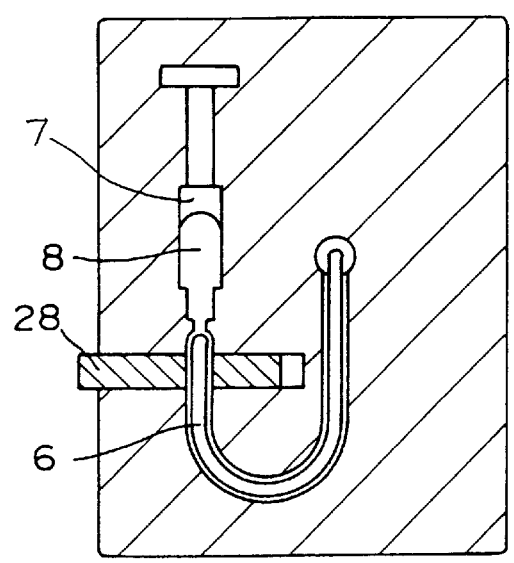

On the second step, as shown in FIG. 24(b), a nitrogen gas was charged into the resin through a pressurized gas charging port (not shown in Figures) arranged at a nozzle part of the molding machine. 0.5 second after the nitrogen gas began to be charged, the shut-off valve was operated to link the runner 10 with the gate 1 and 13 and to form a hollow molded article by extruding a part of the injected resin into the cavity 7.

Figure 24C:
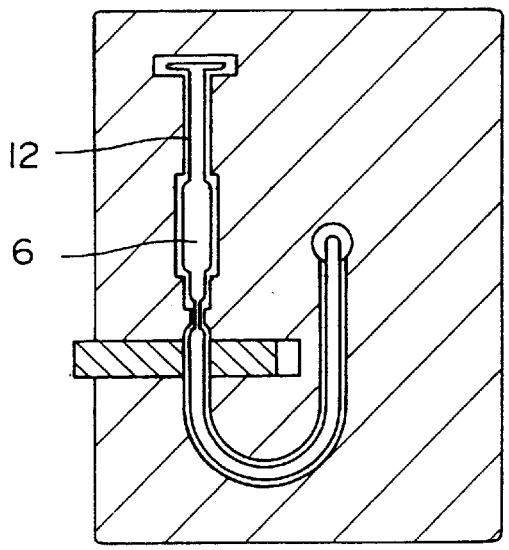

On the third step, the pressure of the nitrogen charged into the resin was maintained for 30 seconds as shown in FIG. 24(c). After the third step, the pressure of the nitrogen gas was released. A molding cycle was about 45 seconds.

The resultant molded articles were evaluated according to the same manner as in Examples 20 to 23. The results are shown in Table 4. Further, other properties (the size of a hollow part, roundness and magnitude of run-out) were evaluated, and the results were similar to those of the molded articles obtained in Examples 1 to 4.

COMPARATIVE EXAMPLES 5 AND 6

A shaft-unified type roller without a hollow part was obtained with a mold shown in FIG. 19 according to the conventional injection molding, which comprises injecting a resin, maintaining pressure and cooling. Resins listed in Table 4 were employed. The pressure maintained, the period of maintaining pressure, the cooling period were 600 kg/cm$^2$, 15 seconds and 40 seconds, respectively. A molding cycle was about 65 seconds.

The resultant molded articles were evaluated according to the same manner as in Examples 20 to 25. The results are shown in Table 4.

EXAMPLES 26 TO 28

Figure 25:
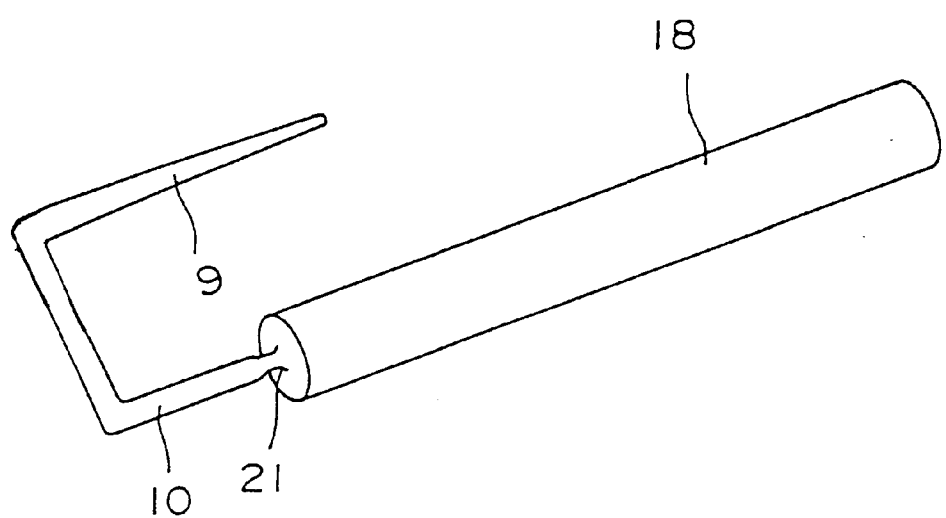
FIG. 25 shows a roller obtained in Examples 26 to 29 of the present invention.

A roller shown in FIG. 25 was formed by hollow injection molding. The size of the roller was as follows:

External diameter: 20 mm

Whole length: 400 mm

Length of gate land: 2.0 mm

Figure 5:
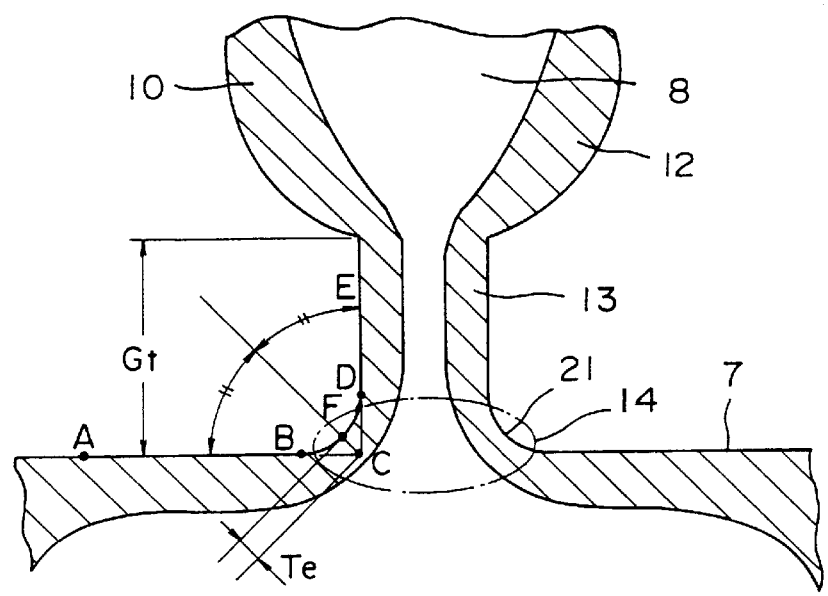
FIG. 5 shows a cross-sectional view of the vicinity of the gate of a mold which is used in one of the molding methods of the present invention, and which has a radiused corner at a boundary between a gate land and a cavity.

In order to prevent the wall of the resultant molded article from being thinner, the corner of the gate was radiused as shown in FIG. 5 so that Te be 0.2 or 0.4 mm as shown in Table 5. Resins listed in Table 5 were employed.

The resin was injected in the molten state into the cavity so as to leave a non-filled part in the cavity. 0.5 second after the injection, a nitrogen gas pressurized to 150 kg/cm$^2$ was charged into the resin through the gas charging port arranged at the nozzle part of the mold for 5 seconds. After charging, the pressure was maintained for 30 seconds, and the pressure of the gas was released.

Hollow injection molding was repeated 1000 shots in each Example to compare frequencies of poor molding due to leakage of the gas. Further, other properties (the size of a hollow part, roundness and magnitude of run-out) were evaluated, and the results were similar to those of the molded articles obtained in Examples 1 to 4.

EXAMPLE 29

Figure 7:
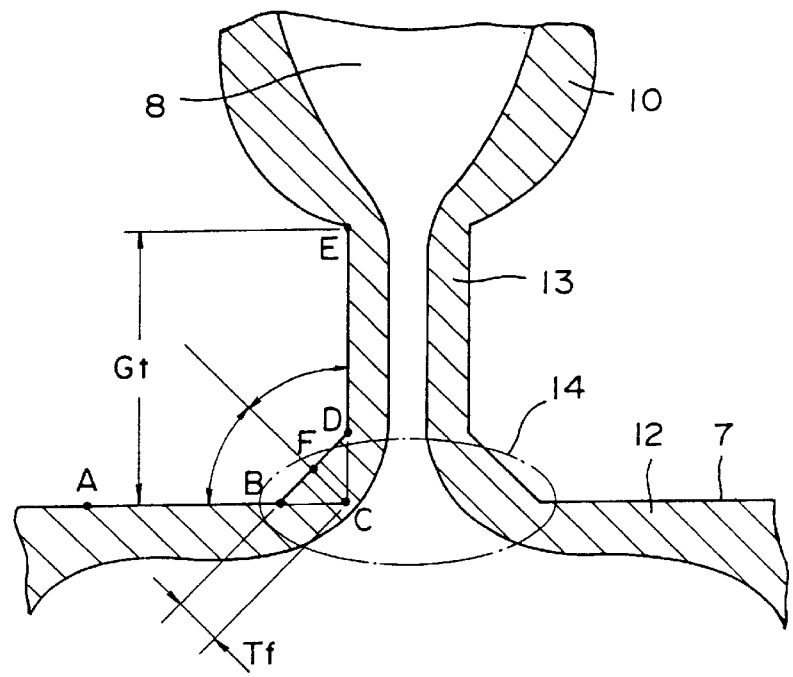
FIG. 7 shows a cross-sectional view of the vicinity of the gate of a mold which is used in one of the molding methods of the present invention,-and which has a beveled corner at a boundary between a roller part and a shaft.
Figure 8:
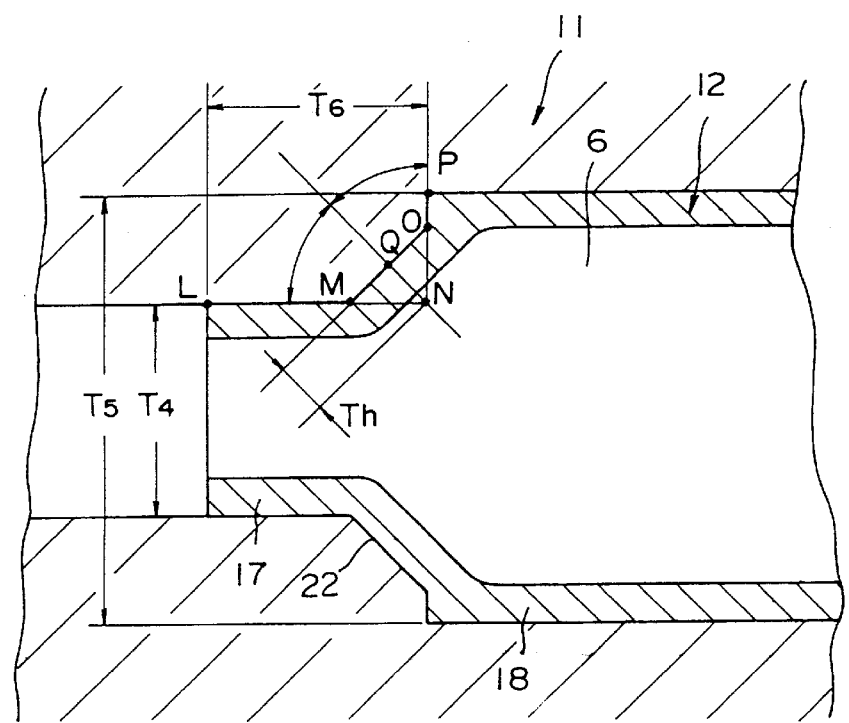
FIG. 8 shows a cross-sectional view of the vicinity of the gate of a mold which is used in one of the molding methods of the present invention, and which has a beveled corner at a boundary between a roller part and a shaft.

Hollow injection molding was carried out according to the same procedure as in Example 27 except that the corner at the connection of the gate land 13 and the gate 14 was beveled as shown in FIG. 7 whereas it was radiused in Examples 26 to 28. The resultant molded article was evaluated according to the same manner as in Example 27. The results are shown in Table 5. Further, other properties (the size of a hollow part, roundness and magnitude of run-out) were evaluated, and the results were similar to those of the molded articles obtained in Examples 1 to 4.

EXAMPLES 30 TO 32

A roller shaped as shown in FIG. 9 was obtained by hollow injection molding. The boundary part 16 of the roller indicates a boundary between a roller part 18 and a shaft 17. At the boundary part 16, 1 or 3 mm radiused corner (Tf) 21 was arranged. The size of the resultant roller was as follows:

Whole length: 280 mm

Roller length: 200 mm

Shaft length (T3): 40 mm

Roller diameter (T2): 40 mm

Shaft diameter: 20 mm

Figure 6:
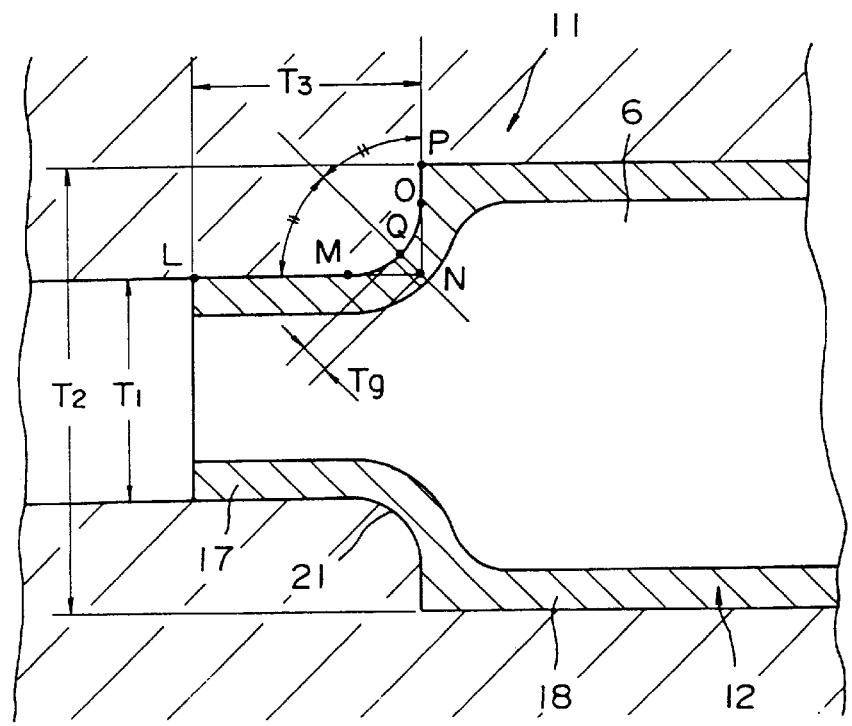
FIG. 6 shows a cross-sectional view of the vicinity of the gate of a mold which is used in one of the molding methods of the present invention, and which has a radiused corner at a boundary between a roller part and a shaft.

T$_2$ and T$_3$: as shown in FIG. 6

Resins listed in Table 6 were employed.

The resin was injected into the cavity in an amount corresponding to 70% of the volume of the cavity 7. 0.5 second after the injection, a nitrogen gas which was preliminarily pressurized to 120 kg/cm$^2$ was charged into the resin through a pressurized gas charging port 1 arranged at the nozzle part of the molding machine. The pressure of the gas was maintained for 40 seconds, and then released. Hollow injection molding was repeated 1000 shots in each Example to compare frequencies of poor molding due to leakage of the gas. The results are shown in Table 6. Further, other properties (the size of a hollow part, roundness and magnitude of run-out) were evaluated, and the results were similar to those of the molded articles obtained in Examples 1 to 4.

EXAMPLE 33

Hollow injection molding was carried out according to the same procedure as in Example 31 except that the radiused corner at the boundary part between the shaft part and the roller part of Examples 30 to 32 was changed to a beveled corner, and evaluation was also conducted according to the same manner. The results are show in Table 6. Further, other properties (the size of a hollow part, roundness and magnitude of run-out) were evaluated, and the results were similar to those of the molded articles obtained in Examples 1 to 4.

EXAMPLES 34 TO 37

Figure 26A:
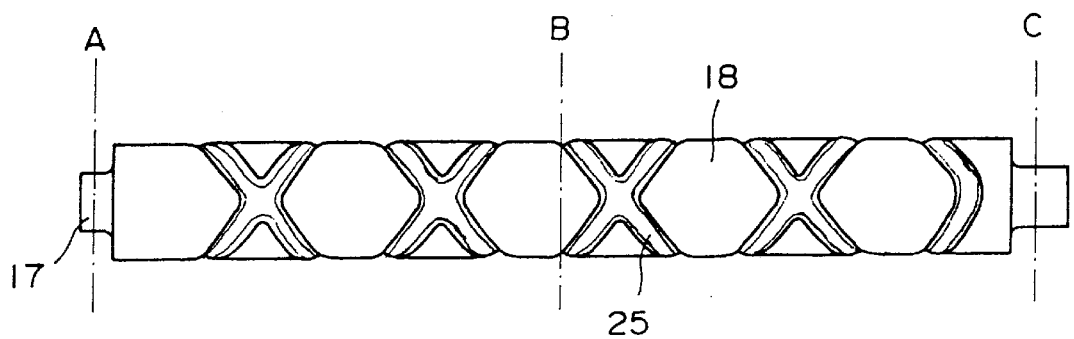
FIG. 26(a) shows a roller having grooves obtained in Examples 34 to 37 of the present invention.
Figure 26B:
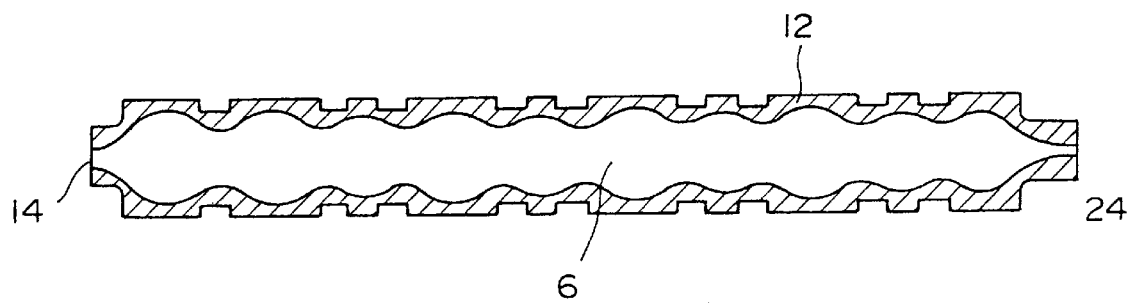
FIG. 26(b) shows a cross-sectional view along the axis of the roller of FIG. 27(a).
Figure 26C:
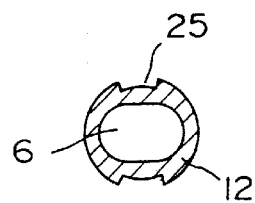
FIG. 26(c) shows a cross-sectional view taken along the line vertical to the axis of the roller of FIG. 26(a).

A shaft-unified type roller having grooves 25 on its surface as shown in FIG. 26(a) was obtained by hollow injection molding. As shown in FIG. 16, in the mold, a cavity was arranged so that the axis of the roller may be vertical, and an additional cavity was set above the cavity. A gate was arranged on the axis of the bottom of the cavity, and a cavity side inlet of the passage linking the cavity and the additional cavity was arranged on the axis of the top of the cavity. Further, a shut-off valve was equipped in the middle of the passage for the purpose of optionally separating and linking the cavity and the additional cavity.

In Examples 34 to 37, hollow injection molding was carried out according to the same procedure as in Examples 30 to 32 except that an inner volume of the additional cavity was changed. The volume in each Example corresponded to 25, 30, 35, 40% of the volume of the resultant shaft-unified type roller, respectively.

The thicknesses (maximum and minimum) of the resultant molded article were measured by cutting the article at point B in FIG. 26(a). Further, length of the hollow part along the axis of the article was also measured.

The run-out was measured at point B of the molded article while supporting the article at points A and C in FIG. 26(a). The measured value at point B excluding the value at groove part was defined as an evaluated value.

The roundness was measured at point C in FIG. 26(a). The results of the measurement are shown in Table 7. Further, surface roughness was also measured; it was the same degree as that in Examples 20 and 21.

EXAMPLES 38 TO 43 AND COMPARATIVE EXAMPLES 7 TO 12

Figure 27:
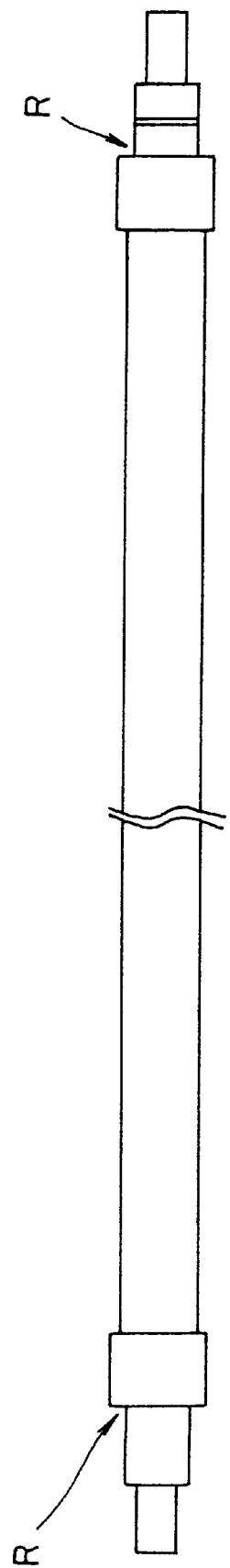
FIG. 27 shows a paper feeding roller obtained in Examples 38 to 43 and Comparative Examples 7 to 12 of the present invention.

A shaft-unified type paper feeding roller as shown in FIG. 27 was obtained by hollow injection molding. As mentioned in Table 8, a cavity having radiused corners at both its gate and boundary between a roller part and a shaft part was arranged so that the axis of the roller may be vertical. Further, on a runner, a shut-off valve capable of optionally separating and linking the runner and the cavity was arranged.

Molding was carried out according to the same procedure as in Example 20 except that the cavity and the runner were separated by the shut-off valve until a gas began to be charged.

In Comparative Examples 7 to 12, molding was carried out according to the same procedure as in Examples 38 to 43 except that the cavity in the mold was arranged so that the axis of the roller may be horizontal.

The molded articles obtained in Examples 38 to 43 had similar size of the hollow part, gas leakage at the gate and value of breaking load to those of the molded articles obtained in Examples 1 to 4 and 26 to 32. To the contrary, the molded articles obtained in Comparative Examples 7 to 12 were inferior to those obtained in Examples 38 to 43. The results of other evaluations are shown in Table 8.

When other properties (the size of a hollow part, frequency of poor molding and a breaking load) were evaluated, the desirable results were obtained.

EXAMPLES 44 TO 49 AND COMPARATIVE EXAMPLES 13 TO 18

A shaft-unified type paper feeding roller as shown in FIG. 27 was obtained by hollow injection molding. As mentioned in Table 9, a cavity having beveled corners at both its gate and boundary between a roller part and a shaft part was arranged so that the axis of the roller may be vertical. Further, on a runner, a shut-off valve capable of optionally separating and linking the runner and the cavity was arranged.

Molding was carried out according to the same procedure as in Example 14 except that the cavity and the runner were separated by the shut-off valve until a gas began to be charged.

In Comparative Examples 13 to 18, molding was carried out according to the same procedure as in Examples 44 to 49 except that the cavity in the mold was arranged so that the axis of the roller may be horizontal.

The molded articles obtained in Examples 44 to 49 had similar size of the hollow part, gas leakage at the gate and value of breaking load to those of the molded articles obtained in Examples 1 to 4 and 26 to 32. To the contrary, the molded articles obtained in Comparative Examples 13 to 18 were inferior to those obtained in Examples 44 to 49. The results of other evaluations are shown in Table 9.

When other properties (the size of a hollow part, frequency of poor molding and a breaking load) were evaluated, the desirable results were obtained.

Industrial Application

According to the method for hollow injection molding of the present invention, a shaft-unified type resin rotator can be obtained by one injection. Therefore, a shaft-unified type rotator can be obtained not only within a short period but also stably with one shot. In other words, the method for hollow injection molding of the present invention has excellent productivity.

The resultant rotator obtained by the-method of the present invention has high dimensional accuracy and a good appearance. In addition, recyclability of materials is improved comparing to a molded article comprising a metal shaft and a resin.

Consequently, the shaft-unified type resin rotator is useful in various fields such as automobiles, ordinary machinery, precision machinery and electric and electronic equipment. The rotator is especially useful for a paper feeding parts of facsimile machines, copy machines, printers and the like.

TABLE 1

| | Resin used | Mold structure | Axis direction of cavity in mold | Molding method | d1 (mm) | d2 (mm) | (d1 − d2)/d1 | Roundness (μm) Point A | Point B | Point C | Magnitude of run-out (μm) |
|---|---|---|---|---|---|---|---|---|---|---|---|
| Ex. 1 | Polyacetal copolymer resin | FIG. 13 | Vertical | Short shot | 4.08 | 3.96 | 0.03 | 16 | 20 | 14 | 140 |
| Ex. 2 | Nylon 66 | FIG. 13 | Vertical | Short shot | 4.04 | 4.00 | 0.01 | 10 | 12 | 12 | 124 |
| Ex. 3 | Modified PPE resin | FIG. 13 | Vertical | Short shot | 4.12 | 3.98 | 0.03 | 14 | 18 | 18 | 128 |
| Ex. 4 | ABS resin | FIG. 13 | Vertical | Short shot | 4.26 | 4.18 | 0.02 | 12 | 18 | 14 | 118 |
| Comp. Ex. 1 | Polyacetal copolymer resin | FIG. 14 | Horizontal | Short shot | 4.56 | 3.62 | 0.21 | 76 | 86 | 78 | 850 |
| Comp. Ex. 2 | Nylon 66 | FIG. 14 | Horizontal | Short shot | 4.66 | 3.70 | 0.21 | 88 | 92 | 26 | 920 |
| Comp. Ex. 3 | Modified PPE resin | FIG. 14 | Horizontal | Short shot | 4.88 | 4.08 | 0.16 | 66 | 72 | 74 | 840 |
| Comp. Ex. 4 | ABS resin | FIG. 14 | Horizontal | Short shot | 4.86 | 4.12 | 0.15 | 78 | 82 | 66 | 920 |

TABLE 2

| | Resin used | Mold structure | Molding method | Position of Pressurized gas charging port (in FIG. 13) | d1 (mm) | d2 (mm) | (d1−d2)/d1 | Roundness (μm) Point A | Point B | Point C | Magnitude of run-out (μm) |
|---|---|---|---|---|---|---|---|---|---|---|---|
| Ex. 5 | Polyacetal copolymer resin | FIG. 13 | Short shot | Nozzle | 4.08 | 3.96 | 0.03 | 16 | 20 | 12 | 140 |
| Ex. 6 | Polyacetal copolymer resin | FIG. 13 | Short shot | Runner (A) | 4.11 | 3.92 | 0.05 | 18 | 22 | 18 | 150 |
| Ex. 7 | Polyacetal copolymer resin | FIG. 13 | Short shot | Cavity (B) | 4.22 | 3.88 | 0.08 | 32 | 42 | 38 | 260 |
| Ex. 8 | Nylon 66 | FIG. 13 | Short shot | Nozzle | 4.12 | 4.04 | 0.02 | 12 | 14 | 12 | 110 |
| Ex. 9 | Nylon 66 | FIG. 13 | Short shot | Runner (A) | 4.15 | 4.08 | 0.02 | 18 | 20 | 22 | 130 |
| Ex. 10 | Nylon 66 | FIG. 13 | Short shot | Cavity (B) | 4.30 | 4.06 | 0.06 | 36 | 38 | 42 | 320 |
| Ex. 11 | Modified PPE resin | FIG. 13 | Short shot | Nozzle | 4.22 | 4.16 | 0.01 | 14 | 16 | 12 | 100 |
| Ex. 12 | Modified PPE resin | FIG. 13 | Short shot | Runner (A) | 4.26 | 4.18 | 0.02 | 22 | 16 | 24 | 145 |
| Ex. 13 | Modified PPE resin | FIG. 13 | Short shot | Cavity (B) | 4.32 | 3.96 | 0.08 | 42 | 40 | 44 | 300 |

TABLE 3

| | Resin used | Mold structure | Shut-off valve | Length of hollow part along axis of rotator | Roundness (μm) | | | Magnitude of run-out (μm) | Surface roughness of roller part Rmax (μm) |
|---|---|---|---|---|---|---|---|---|---|
| | | | | | Point A | Point B | Point C | | |
| Ex. 14 | Polyacetal copolymer resin | FIG. 15 | Not used | 90% | 16 | 20 | 18 | 135 | 28 |
| Ex. 15 | Polyacetal copolymer resin containing glass fiber | FIG. 15 | Not used | 95% | 14 | 16 | 20 | 120 | 36 |
| Ex. 16 | ABS resin | FIG. 15 | Not used | 90% | 24 | 22 | 26 | 165 | 18 |
| Ex. 17 | Polyacetal copolymer resin | FIG. 16 | Used | 100% | 12 | 14 | 12 | 100 | 18 |
| Ex. 18 | Polyacetal copolymer resin containing glass fiber | FIG. 16 | Used | 100% | 10 | 8 | 8 | 80 | 24 |
| Ex. 19 | ABS resin | FIG. 16 | Used | 100% | 12 | 16 | 14 | 100 | 10 |

TABLE 4

| | Resin used | Molding method | Surface roughness of roller part (μm) |
|---|---|---|---|
| Ex. 20 | Polyacetal copolymer resin | FIGS. 20 (a) to (c) | 32 |
| Ex. 21 | Polyacetal type resin | FIGS. 20 (a) to (c) | 48 |
| Ex. 22 | Polyacetal copolymer resin | FIGS. 23 (a) to (c) | 14 |
| Ex. 23 | Polyacetal type resin | FIGS. 23 (a) to (c) | 18 |
| Ex. 24 | Polyacetal copolymer resin | FIGS. 25 (a) to (c) | 10 |
| Ex. 25 | Polyacetal type resin | FIGS. 25 (a) to (c) | 14 |
| Comp. Ex. 5 | Polyacetal copolymer resin | Conventional injection molding | 64 |
| Comp. Ex. 6 | Polyacetal type resin | Conventional injection molding | 92 |

TABLE 5

| | Resin Used | Gate shape, Te (mm) | Frequency of poor molding (1000 shot continuous molding) (%) |
|---|---|---|---|
| Ex. 26 | Polyacetal copolymer resin | Radiused corner, 0.2 | 1.2 |
| Ex. 27 | Polyacetal copolymer resin | Radiused corner, 0.4 | 0.0 |
| Ex. 28 | Nylon 66 | Radiused corner, 0.4 | 0.0 |
| Ex. 29 | Polyacetal copolymer resin | Beveled corner, 0.4 | 0.2 |

TABLE 6

| | Resin Used | Corner shape of hollow part, Tf (mm) | Frequency of poor molding (1000 shot continuous molding) (%) | Breaking load (kg) |
|---|---|---|---|---|
| Ex. 30 | Polyacetal copolymer resin | Radiused corner, 1 | 0.1 | 24 |
| Ex. 31 | Polyacetal copolymer resin | Radiused corner, 3 | 0.0 | 38 |
| Ex. 32 | Nylon 66 | Radiused corner, 3 | 0.0 | 43 |
| Ex. 33 | Polyacetal copolymer resin | Beveled corner, 2 | 0.1 | 34 |

TABLE 8

| | Resin used | Axis direction of cavity in mold | Additional Cavity | Te (mm) | Tf (mm) | Frequency of poor molding | Run-out (μm) | Appearance of roller part (μm) | Roundness (μm) | | |
|---|---|---|---|---|---|---|---|---|---|---|---|
| | | | | | | | | | Point A | Point B | Point C |
| Ex. 38 | Polyacetal resin | Vertical | Used | 0.5 | 1.0 | 1.8 | 80 | 18 | 12 | 12 | 10 |
| Ex. 39 | Polyacetal resin | Vertical | Used | 1.0 | 1.0 | 1.0 | 76 | 12 | 10 | 10 | 8 |
| Ex. 40 | Polyacetal resin | Vertical | Used | 1.0 | 1.5 | 0.3 | 70 | 8 | 5 | 6 | 6 |
| Ex. 41 | Nylon 66 resin | Vertical | Used | 0.5 | 1.0 | 1.7 | 84 | 16 | 12 | 14 | 14 |
| Ex. 42 | Nylon 66 resin | Vertical | Used | 1.0 | 1.0 | 1.1 | 80 | 10 | 12 | 12 | 10 |
| Ex. 43 | Nylon 66 resin | Vertical | Used | 1.0 | 1.5 | 0.4 | 80 | 8 | 8 | 8 | 6 |
| Comp.Ex. 7 | Polyacetal resin | Horizontal | Used | 0.5 | 1.0 | 17.5 | 630 | 54 | 84 | 92 | 88 |
| Comp.Ex. 8 | Polyacetal resin | Horizontal | Used | 1.0 | 1.0 | 12.4 | 560 | 42 | 80 | 88 | 84 |
| Comp.Ex. 9 | Polyacetal resin | Horizontal | Used | 1.0 | 1.5 | 8.7 | 540 | 30 | 78 | 84 | 80 |
| Comp.Ex. 10 | Nylon 66 resin | Horizontal | Used | 0.5 | 1.0 | 18.3 | 720 | 42 | 76 | 86 | 80 |
| Comp.Ex. 11 | Nylon 66 resin | Horizontal | Used | 1.0 | 1.0 | 13.1 | 680 | 36 | 70 | 78 | 72 |
| Comp.Ex. 12 | Nylon 66 resin | Horizontal | Used | 1.0 | 1.5 | 9.2 | 660 | 28 | 70 | 70 | 68 |

TABLE 9

| | Resin used | Axis direction of cavity in mold | Additional Cavity | Te (mm) | Tf (mm) | Frequency of poor molding | Run-out (μm) | Appearance of roller part (μm) | Roundness (μm) | | |
|---|---|---|---|---|---|---|---|---|---|---|---|
| | | | | | | | | | Point A | Point B | Point C |
| Ex. 44 | Polyacetal resin | Vertical | Used | 1.0 | 1.5 | 1.6 | 78 | 12 | 12 | 14 | 14 |
| Ex. 45 | Polyacetal resin | Vertical | Used | 1.5 | 1.5 | 0.8 | 74 | 8 | 10 | 12 | 8 |
| Ex. 46 | Polyacetal resin | Vertical | Used | 1.5 | 2.0 | 0.5 | 74 | 6 | 6 | 10 | 6 |
| Ex. 47 | Polyacetal type resin | Vertical | Used | 1.0 | 1.5 | 2.3 | 90 | 22 | 18 | 18 | 14 |
| Ex. 48 | Polyacetal type resin | Vertical | Used | 1.5 | 1.5 | 1.8 | 86 | 16 | 14 | 12 | 10 |
| Ex. 49 | Polyacetal type resin | Vertical | Used | 1.5 | 2.0 | 1.2 | 84 | 12 | 10 | 12 | 10 |
| Comp.Ex. 13 | Polyacetal resin | Horizontal | Used | 1.0 | 1.5 | 17.5 | 630 | 56 | 80 | 94 | 86 |
| Comp.Ex. 14 | Polyacetal resin | Horizontal | Used | 1.5 | 1.5 | 12.4 | 560 | 40 | 78 | 86 | 82 |
| Comp.Ex. 15 | Polyacetal resin | Horizontal | Used | 1.5 | 2.0 | 8.7 | 540 | 32 | 76 | 80 | 78 |
| Comp.Ex. 16 | Polyacetal type resin | Horizontal | Used | 1.0 | 1.5 | 18.3 | 820 | 54 | 88 | 96 | 98 |
| Comp.Ex. 17 | Polyacetal type resin | Horizontal | Used | 1.5 | 1.5 | 13.1 | 780 | 46 | 82 | 86 | 82 |
| Comp.Ex. 18 | Polyacetal type resin | Horizontal | Used | 1.5 | 2.0 | 9.2 | 760 | 44 | 82 | 80 | 78 |

What is claimed is:

1. A method for preparing a shaft-unified rotator comprising at least one shape required to perform a function by revolving on an axis of the shaft, wherein the rotator has a hollow part in the inside formed along the axis of the shaft, which method comprises, in a mold wherein a sprue, a runner, a gate, and a cavity are provided in this order along the flowing direction of a molten resin, arranging the mold having a gate equipped at the intersection of the axis of the rotator and an edge surface of a cavity so that the edge surface having the gate comprises the bottom of the cavity and the axis is vertical, and carrying out hollow injection molding.

2. The method for preparing the rotator according to claim 1, wherein the hollow injection molding is carried out by charging a pressured fluid into a cavity through a gate.

3. The method for preparing the rotator according to claim 1 or 2, wherein the hollow injection molding is carried out by injecting a molten resin into the cavity so as to leave a non-filled part, and subsequently charging a pressurized fluid into the cavity to spread the resin into the non-filled part.

4. The method for preparing the rotator according to claim 3, wherein the hollow injection molding is carried out by injecting the resin into the cavity in an amount corresponding to 50 to 90% of the internal volume of the cavity.

5. The method for preparing the rotator according to claim 1 or 2, wherein the hollow injection molding is carried out by charging a pressurized fluid into the cavity while injecting a molten resin into the cavity.

6. The method for preparing the rotator according to claim 1 or 2, wherein the hollow injection molding is carried out by injecting a molten resin into the cavity, the cavity having an additional cavity linked with the cavity so as not to leave a non-filled part, and subsequently charging a pressurized fluid into the resin.

7. The method for preparing the rotator according to claim 6, wherein the hollow injection molding is carried out with a mold in which an additional cavity is arranged above the cavity and linked with the cavity by a passage arranged from the top of the cavity along the extension line of the axis.

8. The method for preparing the rotator according to claim 6, wherein the hollow injection molding is carried out by arranging a shut-off valve on a passage connecting a cavity and an additional cavity, injecting a molten resin into the cavity with the valve close, and charging a pressurized fluid into the cavity with the valve open.

9. The method for preparing the rotator according to claim 1, wherein the hollow injection molding is carried out by injecting a resin into a part or the whole part of a space between the sprue of the mold and the gate, and charging a pressurized fluid from a charging port which is arranged at a point closer to the nozzle provided before the sprue along the flow direction of the resin than the point to which an amount of a resin required for molding is supplied.

10. The method for preparing the rotator according to claim 9, wherein the hollow injection molding is carried out by injecting a molten resin in a part or the whole part of a space between the sprue of the mold and the gate under the condition that a shut-off valve arranged between a runner of the mold and the cavity is closed, and subsequently charging a pressurized fluid under the condition that the shut-off valve is opened.

11. The method for preparing the rotator according to claim 1 or 2, wherein the hollow injection molding is carried out by using a mold in which a single or plurality of corners of the cavity is radiused or beveled.

12. The method for preparing the rotator according to claim 11, wherein the hollow injection molding is carried out by using a mold in which the corner is radiused.

13. The method for preparing the rotator according to claim 12, wherein the hollow injection molding is carried out by using a mold in which the radiused corner at a gate satisfies the relationships defined by the following formula:

$$0.1 \text{ mm} \leq Te \leq (\sqrt{2}-1) \times Gt$$

wherein Gt represents the length of segment CE (C is an intersection of segment AB and segment DE where A is a point on the cavity surface on the gate side, B and D individually indicate an intersection of the surface of a radiused corner and surface of the cavity on the gate side, and E indicates a boundary between a gate land and the sprue or runner of the mold); and Te represents the length of segment CF (F is an intersection of the surface of a radiused corner and the bisector of <ACE).

14. The method for preparing the rotator according to claim 12, wherein the hollow injection molding is carried out by using a mold in which the radiused corner other than the corner at a gate satisfies the relationships defined by the following formulas:

a) $0.4 \text{ mm} \leq Tg \leq (\sqrt{2}-1)/2 \times (T2-T1)$
   in the case of $5 \text{ mm} \leq T2-T1 \leq T3 \times 2$; and b) $0.4 \text{ mm} \leq Tg \leq (\sqrt{2}-1) \times T3$
   in the case of $5 \text{ mm} \leq T3 \times 2 \leq T2-T1$;

wherein Tg represents the length of segment NQ (N is an intersection of segment LM and segment OP where L is a point on the surface of the cavity whose corner is radiused, M and O individually indicate an intersection of the surface of a radiused corner and surface of the cavity on the gate side, P indicates a boundary between a gate land and the sprue or runner of the mold, and Q is an intersection of the surface of a radiused corner and the bisector of <LNP); T3 represents the length of segment LN; T1 and T2 represent diameters of a shaft part and a roller part, respectively, when both parts are shaped in cylinders; T1 and/or T2 represents the diameter of a pitch circle when both or either part is shaped in a gear; and T1 and/or T2 represents the smallest diameter of a cam when both or either part is shaped in a cam.

15. The method for preparing the rotator according to claim 11, wherein the hollow injection molding is carried out by using a mold in which the corner is beveled.

16. The method for preparing the rotator according to claim 15, wherein the hollow injection molding is carried out by using a mold in which the beveled corner at a gate satisfies the relationships defined by the following formula:

$$0.1 \text{ mm} \leq Tf \leq (\sqrt{2}-1) \times Gt$$

wherein Gt represents the length of segment CE (C is an intersection of segment AB and segment DE, wherein A is a point on a cavity surface on the gate side, B and D individually indicate an intersection of the surface of a beveled corner and a surface of the cavity on the gate side and E indicates a boundary between a gate land and the sprue or runner of the mold); and Tf represents the length of segment CF (F is an intersection of the surface of a beveled corner and the bisector of <ACE).

17. The method for preparing the rotator according to claim 15, wherein the hollow injection molding is carried out by using a mold in which the beveled corner other than the corner of a gate satisfies the relationship defined by the following formulas:

a) $0.4 \text{ mm} \leq Th \leq \leq \sqrt{2}/4 \times (T5-T4)$
   in the case of $5 \text{ mm} \leq T5-T4 \leq T6 \times 2$;

b) $0.4 \text{ mm} \leq Th \leq \sqrt{2}/2 \times T6$
   in the case of $5 \text{ mm} \leq T6 \times 2 \leq T5-T4$;

wherein Th represents the length of segment NQ (N is an intersection of segment LM and segment OP, where L is a point on the surface of the cavity whose corner is beveled, M and O individually indicate an intersection of the surface of a beveled corner and surface of the cavity on the gate side, P indicates a boundary between a gate land and the sprue or runner of the mold and Q is an intersection of the surface of a beveled corner and the bisector of <LNP); T6 represents the length of segment LN; T4 and T5 represent diameters of a shaft part and a roller part, respectively, when both parts are shaped in cylinders; T4 and/or T5 represents the diameter of a pitch circle when both or either part is shaped in a gear; and T4 and/or T5 represents the smallest diameter of a cam when both or either part is shaped in a cam.

18. The shaft-unified rotator obtained by the method of claim 1, wherein a single or plurality of corners is radiused or beveled.

19. The shaft-unified type rotator according to claim 18, wherein a single or plurality of corners is radiused.

20. The shaft-unified rotator according to claim 18, wherein a single or plurality of corners is beveled.

21. The shaft-unified rotator obtained by the method of claim 1, wherein a ratio of the length of a hollow part along the axis to the whole length of the rotator along the axis is 80% or more.

22. The shaft-unified rotator according to claim 18 or 21, wherein the shape of the hollow part of the rotator satisfies a relationship defined by the following formula:

$$0 \leq (d1-d2)/d1 \leq 0.1$$

wherein, d1 and d2 represent the longest distance and the shortest distance between the axis and the inner surface of the rotator, respectively.

23. A shaft-unified rotator having a hollow part in the inside, prepared by a method which comprises:

arranging a mold having a gate equipped at the intersection of an axis of the rotator and an edge surface of a cavity so that the edge surface having the gate comprises the bottom of the cavity, and the axis is vertical; and carrying out hollow injection molding, wherein a single or plurality of corners is radiused or beveled and a groove is arranged on the surface of the rotator.

24. A shaft-unified rotator having a hollow part in the inside, prepared by a method which comprises:

arranging a mold having a gate equipped at the intersection of an axis of the rotator and an edge surface of a cavity so that the edge surface having the gate comprises the bottom of the cavity and the axis is vertical; and carrying out hollow injection molding, wherein a ratio of the length of a hollow part along the axis to the whole length of the rotator is 80% or more, and a groove is arranged on the surface of the rotator.

25. The shaft-unified rotator according to claim 23 or 24, wherein a groove and a hollow part satisfies a relation ship defined by the following formula:

$$0.7 \leq (R2-r2)/(R1-r1) \leq 1$$

wherein, in a cross-sectional view vertical to the axis which includes a groove part, R1 and R2 represent a longest distance and a shortest distance between a center of the axis and an outer surface of the rotator, respectively; and r1 and r2 represent a longest distance and a shortest distance between the axis and an inner surface of the rotator, respectively.

26. The shaft-unified rotator according to claim 23 or 24, wherein corners of the groove are removed by radiusing.

27. The shaft-unified rotator according to claim 23 or 24, wherein the groove is a cam groove.

28. The shaft-unified rotator according to claim 23 or 24, wherin the groove is a key groove.

* * * * *